US012572119B2

(12) United States Patent
Smith et al.

(10) Patent No.: US 12,572,119 B2
(45) Date of Patent: Mar. 10, 2026

(54) ACOUSTIC MONITORING FOR DETECTION OF ANOMALOUS OPERATION OF CLEANING MACHINES

(71) Applicant: Ecolab USA Inc., St. Paul, MN (US)

(72) Inventors: Conor Sylvester Smith, Saint Louis Park, MN (US); Paul Dominic Christian, Apple Valley, MN (US)

(73) Assignee: Ecolab USA Inc., St. Paul, MN (US)

( * ) Notice: Subject to any disclaimer, the term of this patent is extended or adjusted under 35 U.S.C. 154(b) by 376 days.

(21) Appl. No.: 18/309,508

(22) Filed: Apr. 28, 2023

(65) Prior Publication Data

US 2023/0375991 A1 Nov. 23, 2023

Related U.S. Application Data

(60) Provisional application No. 63/365,001, filed on May 19, 2022.

(51) Int. Cl.
*G05B 13/04* (2006.01)
*G01M 99/00* (2011.01)
*G05B 13/02* (2006.01)
*G08C 23/00* (2006.01)

(52) U.S. Cl.
CPC ......... *G05B 13/048* (2013.01); *G01M 99/005* (2013.01); *G05B 13/0265* (2013.01); *G08C 23/00* (2013.01)

(58) Field of Classification Search
None
See application file for complete search history.

(56) References Cited

U.S. PATENT DOCUMENTS

| | | | |
|---|---|---|---|
| 7,271,706 B2 | 9/2007 | Lee | |
| 9,386,140 B2 | 7/2016 | Logan et al. | |
| 9,635,481 B2 | 4/2017 | Matsumoto et al. | |
| 9,759,213 B2 | 9/2017 | Bassett et al. | |
| 9,869,605 B2 | 1/2018 | Rose et al. | |
| 10,091,569 B1 | 10/2018 | Paes et al. | |

(Continued)

FOREIGN PATENT DOCUMENTS

| | | |
|---|---|---|
| CN | 104668252 B | 1/2019 |
| DE | 10204455 A1 | 8/2003 |

(Continued)

OTHER PUBLICATIONS

"Acoustic Monitoring and Background Noise in Industrial Environment," retrieved from https://www.electricmotorengineering.com/acoustic-monitoring-and-background-noise-industrial-environment/ on Feb. 8, 2021, 7 pp.

(Continued)

*Primary Examiner* — Sean Shechtman
(74) *Attorney, Agent, or Firm* — Shumaker & Sieffert, P.A.

(57) ABSTRACT

A computing device and/or computer-implemented method determines whether acoustic data associated with operation of a cleaning machine represents normal or anomalous operation of the cleaning machine. In some examples, upon determining that the acoustic data represents anomalous operation of the cleaning machine, the computing device further identifies a root cause(s) of the anomalous operation and/or one or more remedial actions that may be taken in response the root cause of the anomalous operation.

17 Claims, 11 Drawing Sheets

(56) References Cited

U.S. PATENT DOCUMENTS

| | | | |
|---|---|---|---|
| 10,309,932 | B2 | 6/2019 | Sinha et al. |
| D872,072 | S | 1/2020 | Anderson |
| 10,762,617 | B2 | 9/2020 | Sanders et al. |
| 10,962,439 | B2 | 3/2021 | Enev et al. |
| 11,498,099 | B2 | 11/2022 | Kraus et al. |
| 11,627,861 | B2 | 4/2023 | Smith et al. |
| 11,666,198 | B2 | 6/2023 | Han et al. |
| 2019/0041842 | A1 | 2/2019 | Cella et al. |
| 2021/0068612 | A1 | 3/2021 | Park |
| 2021/0161355 | A1 | 6/2021 | Rahn et al. |
| 2021/0369076 | A1 | 12/2021 | McGinness et al. |
| 2022/0095879 | A1 | 3/2022 | Ellingson |
| 2022/0254006 | A1 | 8/2022 | Jin et al. |
| 2023/0213895 | A1* | 7/2023 | Wang ............... G06N 20/00 700/47 |

FOREIGN PATENT DOCUMENTS

| | | | |
|---|---|---|---|
| WO | 2014137540 | A1 | 9/2014 |
| WO | 2015036311 | A1 | 3/2015 |
| WO | 2015080965 | A1 | 6/2015 |
| WO | 2021006405 | A1 | 1/2021 |

OTHER PUBLICATIONS

"Acoustic Monitoring Systems," International Society of Automation, Jul.-Aug. 2019, 12 pp.

"Amazon Lookout for Equipment," retrieved from https://aws.amazon.com/lookout-for-equipment/ on May 24, 2021, 13 pp.

"Azure AI Custom Vision," retrieved from https://azure.microsoft.com/en-us/products/ai-services/ai-custom-vision/ #overview, on Oct. 10, 2023, 47 pp.

"Azure Machine Learning," retrieved from https://azure.microsoft.com/en-us/products/machine-learning/, on Oct. 10, 2023, 66 pp.

"Bring Your Data Science to Life," retrieved from https://www.iguazio.com/, on Oct. 10, 2023, 14 pp.

"Browse Azure Architectures," retrieved from https://learn.microsoft.com/en-us/azure/architecture/browse/, on Oct. 10, 2023, 7 pp.

"Central Sterile Program," retrieved from https://www.ecolab.com/offerings/central-sterile-program, on Oct. 10, 2023, 10 pp.

"Consumables & Related Accessories," retrieved from https://www.bioquell.com/healthcare/systems-and-services/bioquell-indicators-and-hydrogen-peroxide/#data-scanner?lang=en, on Oct. 10, 2023, 3 pp.

"Fiji," retrieved from https://imagej.net/imagej-wiki-static/Fiji, on Oct. 10, 2023, 3 pp.

"Rapid Bio Intelligence," retrieved from https://www.ecolab.com/nalco-water/offerings/cooling-water-bio-control/rapid-bio-intelligence, on Oct. 10, 2023, 7 pp.

"The Value of Audio Surveillance Applications," White Paper, Louroe Electronics, 2020 (Applicant points out, in accordance with MPEP 609.04(a), that the year of publication, 2020, is sufficiently earlier than the effective U.S. filing date, so that the particular month of publication is not in issue.), 10 pp.

"Wash your hands with Apple Watch Series 4 or later," retrieved from https://support.apple.com/en-us/HT211206, on Mar. 3, 2021, 2 pp.

Altankhuyag et al., "Automated Noise Analysis for Fault Detection," Conference: IFOST 2017, Jun. 2017, 6 pp.

Alves et al., "Effective Acoustic Energy Sensing Exploitation for Target Sources Localization in Urban Acoustic Scenes," Laboratory of Acoustic Signal Processing, Military Institute of Engineering, Oct. 2019, 4 pp.

Carou et al., "Study Based on Sound Monitoring as a Means for Superficial Quality Control in Intermittent Turning of Magnesium Workpieces," 10th CIRP Conference on Intelligent Computation in Manufacturing Engineering—CIRP ICME '16, Dec. 2017, pp. 262-268.

International Search Report and Written Opinion of International Application No. PCT/US2023/020437 dated Aug. 14, 2023, 17 pp.

Invitation to Pay Additional Fees and, Where Applicable, Protest Fee from International Application No. PCT/US2023/020437 dated May 24, 2023, 2 pp.

Laput et al., "Ubicoustics: Plug-and-Play Acoustic Activity Recognition," The 31st Annual ACM Symposium, Oct. 2018, 12 pp.

Liebetrau et al., "Predictive Maintenance with Airborne Sound Analysis," Processing, Sep. 11, 2017, 5 pp.

Maijala et al., "Environmental Noise Monitoring Using Source Classification in Sensors," Applied Acoustics, vol. 129, Jan. 1, 2018, pp. 258-267.

Muhlbauer et al., "Automated Data Labeling and Anomaly Detection Using Airborne Analysis," 53rd CIRP Conference on Manufacturing Systems, Jan. 2020, pp. 1247-1252.

Nasir et al., "Intelligent Machining Monitoring Using Sound Signal Processed With the Wavelet Method and a Self-Organizing Neural Network," IEEE Robotics and Automation Letters, vol. 4, No. 4, Oct. 2019, pp. 3449-3456.

Orman et al., "Acoustic Analysis of Electric Motors in Noisy Industrial Environment," 12th IMEKO TC10 Workshop on Technical Diagnostics New Perspectives in Measurements, Tools and Techniques for Industrial Applications, Jun. 6-7, 2013, 5 pp.

Robinson et al., "Acoustic Anomaly Detection Using Amazon Lookout for Equipment," AWS Machine Learning Blog, Apr. 9, 2021, 3 pp.

Tejedor et al., "Machine Learning Methods for Pipeline Surveillance Systems Based on Distributed Acoustic Sensing: A Review," Applied Sciences, vol. 7, No. 8, Aug. 16, 2017, 26 pp.

Response to Communication Pursuant to Rules 161(1) and 162 EPC dated Jan. 7, 2025, from counterpart European Application No. 23727729.8, filed Jul. 7, 2025, 20 pp.

* cited by examiner

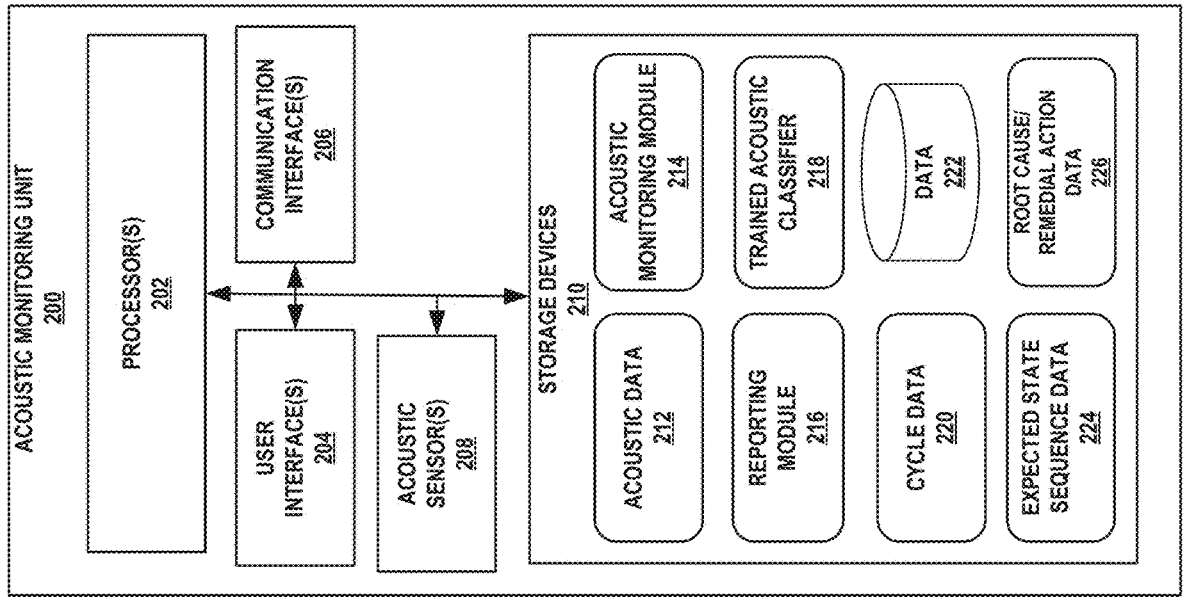
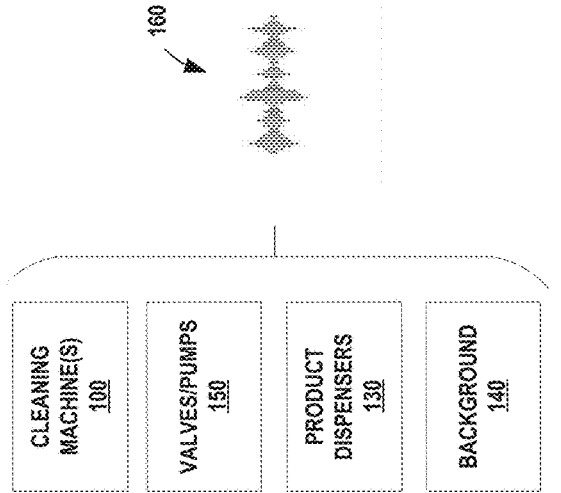
FIG. 2

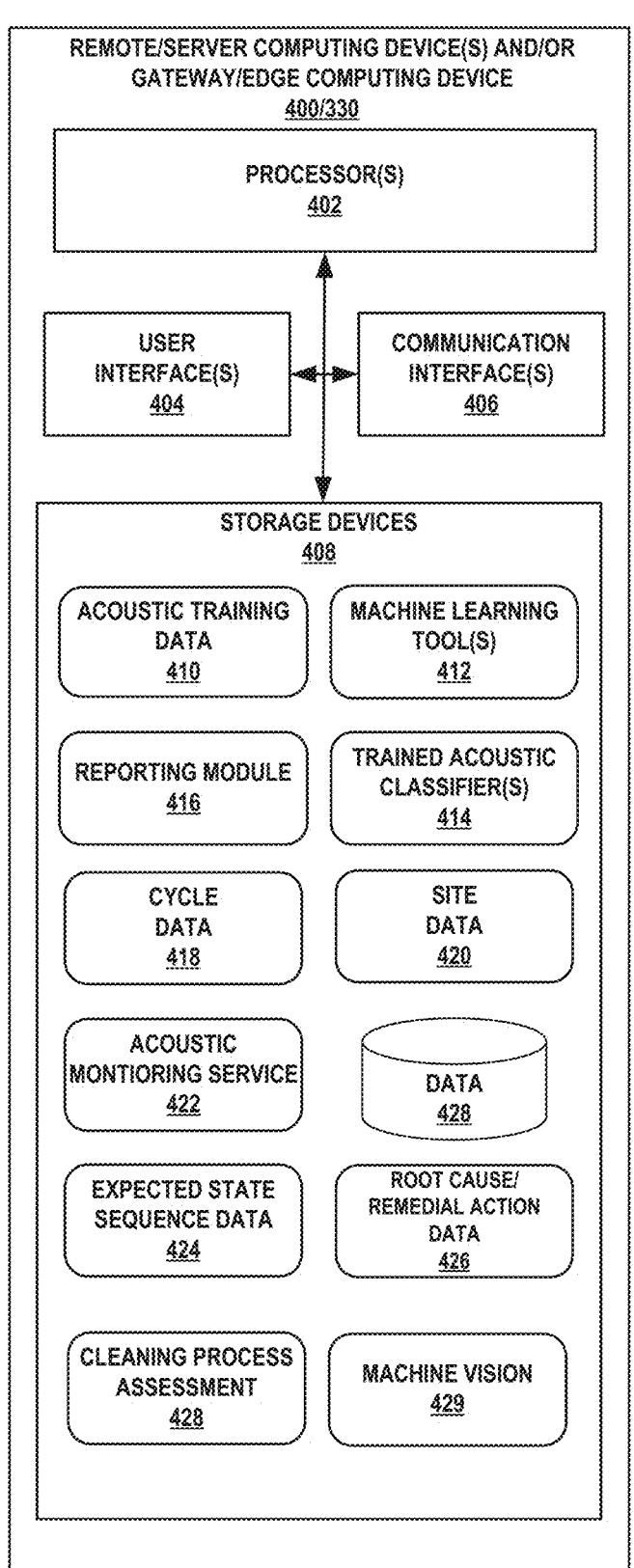

REMOTE/SERVER COMPUTING DEVICE(S) AND/OR
GATEWAY/EDGE COMPUTING DEVICE
400/330

PROCESSOR(S)
402

USER
INTERFACE(S)
404

COMMUNICATION
INTERFACE(S)
406

STORAGE DEVICES
408

ACOUSTIC TRAINING
DATA
410

MACHINE LEARNING
TOOL(S)
412

REPORTING MODULE
416

TRAINED ACOUSTIC
CLASSIFIER(S)
414

CYCLE
DATA
418

SITE
DATA
420

ACOUSTIC
MONTIORING SERVICE
422

DATA
428

EXPECTED STATE
SEQUENCE DATA
424

ROOT CAUSE/
REMEDIAL ACTION
DATA
426

CLEANING PROCESS
ASSESSMENT
428

MACHINE VISION
429

FIG. 4

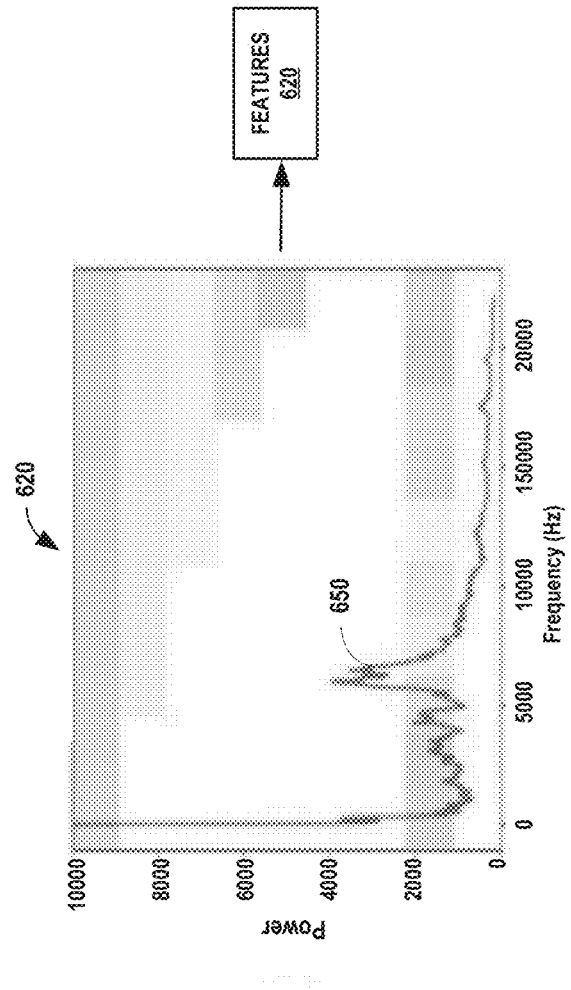
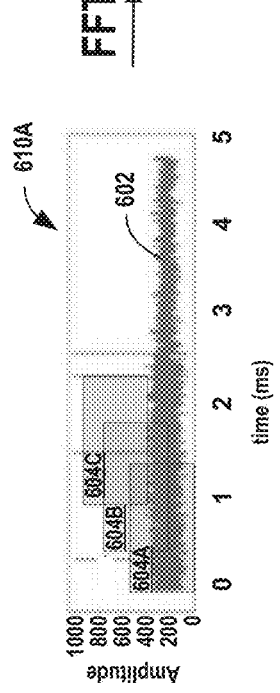
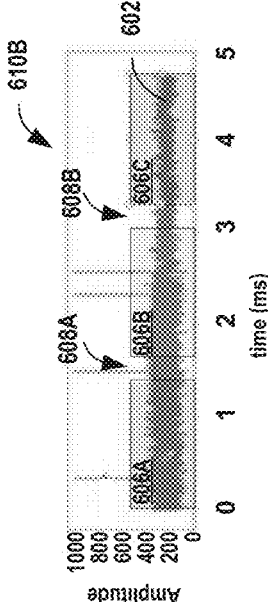
FIG. 6

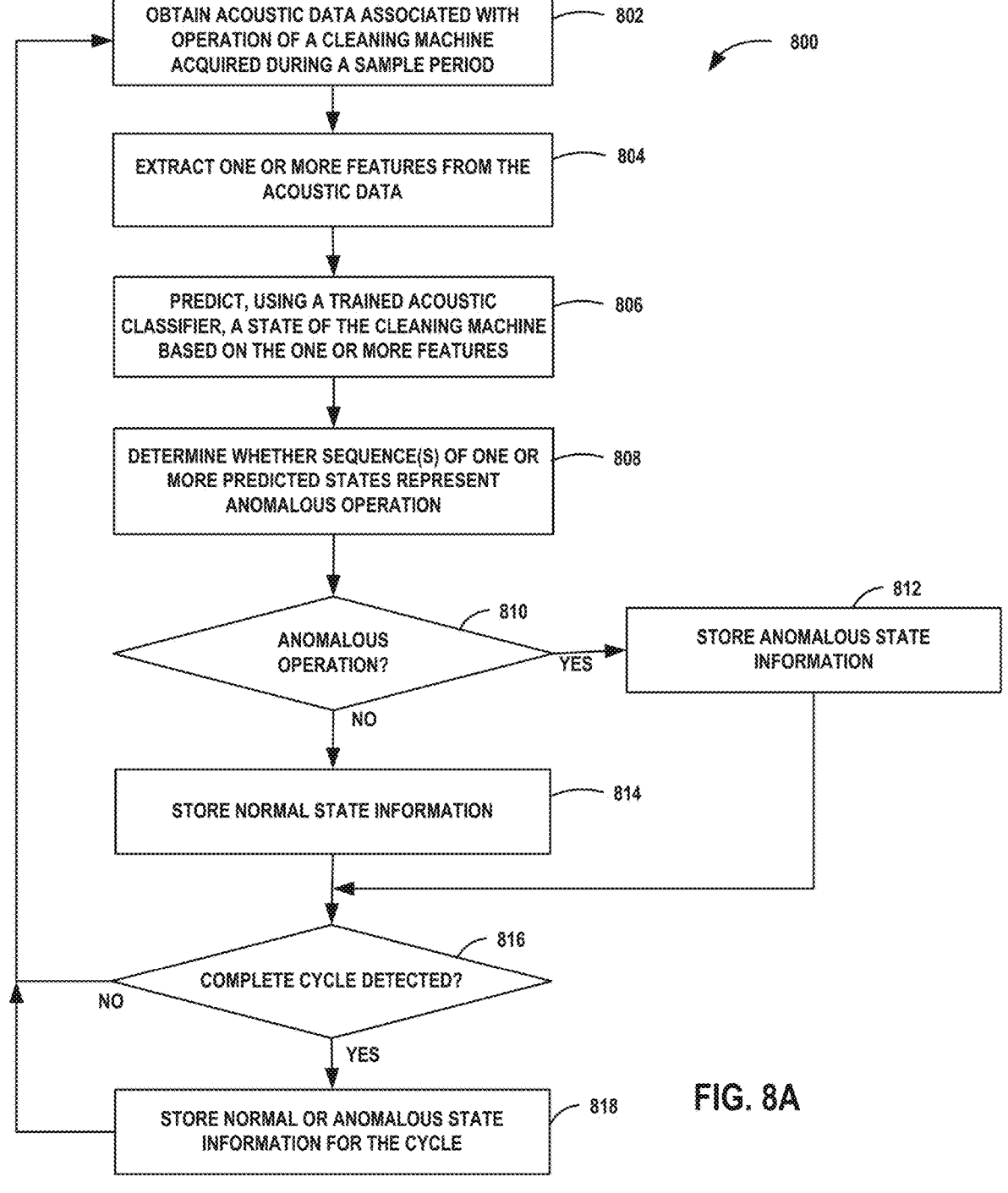

OBTAIN ACOUSTIC DATA ASSOCIATED WITH OPERATION OF A CLEANING MACHINE ACQUIRED DURING A SAMPLE PERIOD — 802

800

EXTRACT ONE OR MORE FEATURES FROM THE ACOUSTIC DATA — 804

PREDICT, USING A TRAINED ACOUSTIC CLASSIFIER, A STATE OF THE CLEANING MACHINE BASED ON THE ONE OR MORE FEATURES — 806

DETERMINE WHETHER SEQUENCE(S) OF ONE OR MORE PREDICTED STATES REPRESENT ANOMALOUS OPERATION — 808

ANOMALOUS OPERATION? — 810

STORE ANOMALOUS STATE INFORMATION — 812

YES

NO

STORE NORMAL STATE INFORMATION — 814

COMPLETE CYCLE DETECTED? — 816

NO

YES

STORE NORMAL OR ANOMALOUS STATE INFORMATION FOR THE CYCLE — 818

FIG. 8A

ACOUSTIC MONITORING FOR DETECTION OF ANOMALOUS OPERATION OF CLEANING MACHINES

This application claims the benefit of U.S. provisional patent application 63/365,001, filed May 19, 2022, the entire content of which is incorporated by reference.

TECHNICAL FIELD

This application relates to generally to monitoring operation of automated cleaning machines.

BACKGROUND

Automated cleaning machines are used in restaurants, healthcare facilities, and other locations to clean, disinfect, and/or sanitize various articles. In a restaurant or food processing facility, automated cleaning machines (e.g., ware wash machines or dish machines) may be used to clean food preparation and eating articles, such as dishware, glassware, pots, pans, utensils, food processing equipment, and other items. In general, articles to be cleaned are placed on a rack and provided to a wash chamber of the automated cleaning machine. In the chamber, one or more cleaning products and/or rinse agents are applied to the articles during a cleaning process. The cleaning process may include one or more wash phases and one or more rinse phases. Water temperature, water pressure, water quality, concentration of the chemical cleaning and/or rinse agents, duration of the wash and/or rinse phases and other factors may impact the efficacy of a cleaning process.

SUMMARY

In general, the disclosure is directed to systems and/or methods that determine whether acoustic data associated with operation of a cleaning machine represents normal or anomalous operation of the cleaning machine. In some examples, upon determining that the acoustic data represents anomalous operation of the cleaning machine, the systems and/or methods further identify a root cause(s) of the anomalous operation and/or one or more remedial actions that may be taken to address and/or alleviate the root cause of the anomalous operation.

In some examples, one or more notifications are generated for receipt by a local or remote computing device indicative of the normal or anomalous operation, the root cause(s) of the anomalous operation and/or one or more suggested remedial action(s) that may be taken in response to identification of the root cause of the anomalous operation. In some examples, a computing device automatically invokes one or more remedial actions in response to identification of the root cause of the anomalous operation.

The acoustic data may include, for example, acoustic data (e.g., sounds) associated with operation of the cleaning machine itself (e.g., machine start-up or shut down, door open and close, anomalous cycle variations for wash and rinse cycles, vibrations of the machine, proper or improper movement of spray arms, water movement within the machine, movement or clatter of dishes, glassware, or other articles within the machine, sounds generated by one or more motors, internal valves or pumps, etc.); acoustic data associated with one or more external valves or pumps associated with operation of the cleaning machine (e.g., fresh water intake, wash water drainage, rinse water drainage, etc.); acoustic data associated with automated product dispensers (e.g., detergent, bleach or rinse aid dispensers, etc.); and/or acoustic data associated with background sounds from the surrounding environment.

In some examples, a computing device predicts, using a trained acoustic classifier, an operational state of the cleaning machine based on acoustic data acquired during each of a plurality of sample periods. In some examples, the acoustic classifier is a machine learning model trained using acoustic training data associated with normal operation of a cleaning machine. In addition or alternatively, in some examples, the acoustic classifier is trained using acoustic training data associated with one or more types of anomalous operation of the cleaning machine. The computing device further determines whether sequence(s) of one or more predicted states represent normal or anomalous operation of the cleaning machine.

The techniques of the disclosure provide one or more technical advantages and practical applications. For example, analysis of acoustic data associated with operation of a cleaning machine to detect anomalous operation as described herein increases the likelihood that anomalous operation(s) of one or more cleaning machines is quickly and accurately identified. By quickly identifying anomalous operation, the techniques of the disclosure further help to ensure that notifications of anomalous operation are efficiently communicated to the appropriate management and/or service personnel, so that preventive and/or corrective maintenance can be performed. In this way, the techniques help to ensure that equipment faults or failures (such as actual failures such as a broken drain valve or other fault or failure) are addressed quickly, or that potential future faults or failures (such as a motor that is struggling or otherwise running at a reduced level of performance) are identified before terminal failure, thus reducing equipment downtime and preventing further worsening of the problem. In addition, by identifying one or more root causes of the anomalous operation, the techniques further simplify and reduce the time required to perform preventive or corrective maintenance. In some examples, the techniques of the disclosure automatically invoke one or more remedial actions in response to identification of the root cause of the anomalous operation, thus increasing operational efficiency and reducing the need for performance of on-site manual maintenance activities. The techniques of the disclosure can thus prevent or reduce the severity of equipment failures, unexpected downtime, costly repairs, and food safety concerns that can arise when cleaning equipment is not functioning properly.

In one example, the disclosure is directed to a method comprising: storing, in a storage device associated with a computing device comprising one or more processors, a trained acoustic classifier; obtaining, by the one or more processors, acoustic data associated with operation of a cleaning machine acquired during a plurality of sample periods; for each respective sample period of the plurality of sample periods, predicting, by the one or more processors using the trained acoustic classifier, an operational state of the cleaning machine from among a plurality of operational states based on the acoustic data acquired during the respective sample period; and determining, by the one or more processors, sequence(s) of one or more of the predicted operational states represent one of normal operation or anomalous operation of the cleaning machine.

In another example, the disclosure is directed to a system comprising: at least one storage device configured to store a trained acoustic classifier; one or more processors; and a memory comprising instructions that when executed by the one or more processors cause the one or more processors to:

obtain acoustic data associated with operation of a cleaning machine acquired during a plurality of sample periods; for each respective sample period of the plurality of sample periods, predict, using the trained acoustic classifier, an operational state of the cleaning machine from among a plurality of operational states based on the acoustic data acquired during the respective sample period; and determine sequence(s) of one or more of the predicted operational states represent one of normal operation or anomalous operation of the cleaning machine.

In another example, the disclosure is directed to a non-transitory computer readable medium comprising instructions that when executed by one or more processors cause the one or more processors to: store a trained acoustic classifier; obtain acoustic data associated with operation of a cleaning machine acquired during a plurality of sample periods; for each respective sample period of the plurality of sample periods, predict, using the trained acoustic classifier, an operational state of the cleaning machine from among a plurality of operational states based on the acoustic data acquired during the respective sample period; and determine sequence(s) of one or more of the predicted operational states represent one of normal operation or anomalous operation of the cleaning machine.

The details of one or more examples are set forth in the accompanying drawings and the description below. Other features will be apparent from the description and drawings, and from the claims.

BRIEF DESCRIPTION OF DRAWINGS

FIG. 2 is a block diagram of an example acoustic monitoring unit in accordance with one or more techniques of the disclosure.

FIG. 4 is a block diagram of an example server computing device configured to train a machine learning model to detect anomalous operation of one or more cleaning machines based on acoustic training data in accordance with one or more techniques of the disclosure.

FIG. 6 shows a graph of example raw acoustic data associated with operation of a cleaning machine, the frequency spectrum corresponding to the example raw acoustic data, and an example feature set extracted from the frequency spectrum in accordance with one or more techniques of the disclosure.

FIG. 8A is a flowchart illustrating an example process by which a computing device, using a trained acoustic classifier, analyzes acoustic data to detect anomalous operation of a cleaning machine in accordance with one or more techniques of the disclosure.

DETAILED DESCRIPTION

Figure 1:
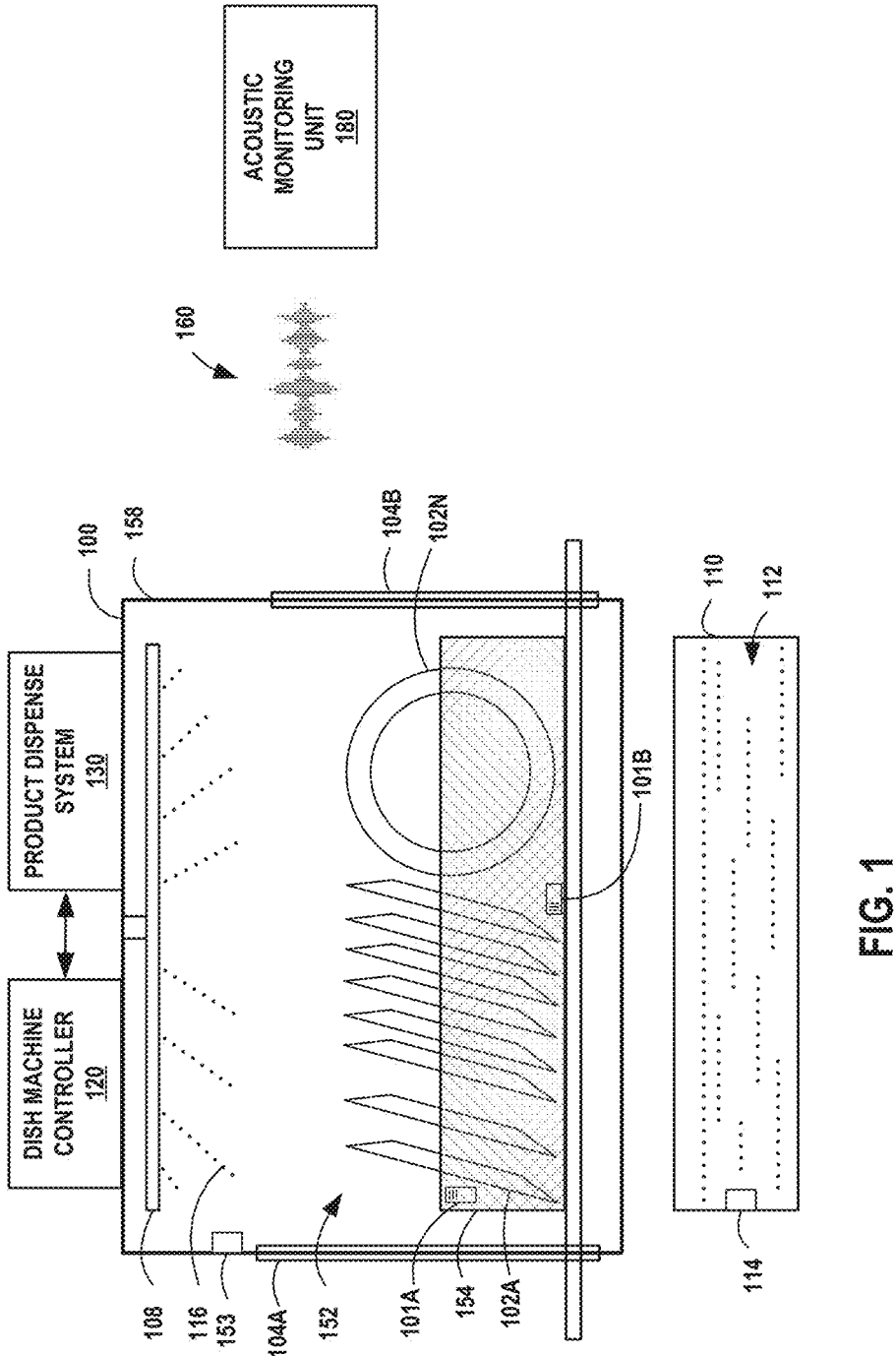
FIG. 1 is a diagram of an example automated cleaning machine and an example acoustic monitoring unit in accordance with one or more techniques of the disclosure.

FIG. 1 is a diagram of an example automated cleaning machine 100 and an example acoustic monitoring unit 180 in accordance with one or more techniques of the disclosure. Acoustic monitoring unit 180 is configured to monitor and/or analyze acoustic data associated with operation of cleaning machine 100 and determine whether the acoustic data is representative of "normal" or "anomalous" operation of the cleaning machine.

In this example, cleaning machine 100 is a commercial door-type dish machine designed for cleaning and/or sanitizing eating and/or food preparation articles 102A-102N. In this example, articles 102A-102N are plates. It shall be understood, however, that articles 102A-102N may also include other eating or food preparation articles such as bowls, coffee cups, glassware, silverware, cooking utensils, pots and pans, and any other cooking equipment, etc. It shall further be understood that cleaning machine 100 may include any other type of cleaning machine such as clothes or textile washing machines, medical instrument re-processors, automated washer disinfectors, autoclaves, sterilizers, or any other type of cleaning machine, and that the disclosure is not limited with respect to the type of cleaning machine or to the types of articles to be cleaned.

Cleaning machine 100 includes an enclosure 158 defining one or more wash chamber(s) 152 and having one or more door(s) 104A, 104B that permit entry and/or exit into wash chamber 152. One or more removable rack(s) 154 are sized to fit inside wash chamber 152. Each rack 154 may be configured to receive articles to be cleaned directly thereon, or they may be configured to receive one or more trays or holders into which articles to be cleaned are held during the cleaning process. The racks 154 may be general or special-purpose racks, and may be configured to hold large and/or small items, food processing/preparation equipment such as pots, pans, cooking utensils, etc., and/or glassware, dishes and other eating utensils, etc. In a hospital or healthcare application, the racks may be configured to hold instrument trays, hardgoods, medical devices, tubing, masks, basins, bowls, bed pans, or other medical items. It shall be understood that the configuration of racks 154, and the description of the items that may be placed on or in racks 154, as shown and described with respect to FIG. 1 and throughout this specification, are for example purposes only, and that the disclosure is not limited in this respect.

In some examples, one or more verification coupons 101A-101B may be placed inside the wash chamber of the cleaning machine. Each verification coupon 101 includes a verification area including one or more soils designed to be removed in response to one or more cleaning process parameters experienced during the cleaning cycle. Analysis of the amount of soil remaining after completion of the cleaning cycle may be used to verify and/or assess cleaning process performance. In some examples, assessment of the cleaning process performance is performed manually by visual inspection of the verification coupon. In addition or alternatively, automated assessment of cleaning process performance includes automated analysis of image, scan and/or color data of the verification coupon captured after completion of cleaning process. In some examples, the cleaning process assessments may be used in combination with the acoustic monitoring techniques described herein to provide a cleaning process performance platform that provides insights into various aspects of cleaning machine performance at one or more sites.

A typical cleaning machine such as cleaning machine 100 operates by spraying one or more cleaning solution(s) 116 (a mixture of water and/or one or more cleaning products) into wash chamber 152 and thus onto the articles to be cleaned. The cleaning solution(s) are pumped to one or more spray arms 108, which spray the cleaning solution(s) 116 into wash chamber 152 at appropriate times under the control of a cleaning machine controller 120 (e.g., a dish machine controller). Cleaning machine 100 is provided with a source of fresh water and, depending upon the application, may also include one or more sumps, such as sump 110, to hold used wash and/or rinse solution 112 to be reused during a subsequent cleaning cycle. Cleaning machine 100 may also include or be associated with a chemical product dispense system 130 that automatically dispenses the appropriate product(s) (e.g., detergent, rinse agent, sanitizer, etc.) at the appropriate time(s) during the cleaning process. Depending upon the machine, the articles to be cleaned, the amount of soil on the articles to be cleaned, and other factors, one or more wash phases may be interspersed with one or more rinse phases and/or sanitization phases to form one complete cleaning cycle of cleaning machine 100.

Cleaning machine 100 may include one or more sensors that monitor one or more cleaning process parameters during execution of each cleaning cycle. For example, cleaning machine 100 may include one or more temperature sensor(s) 153 that measure a temperature inside of the wash chamber 152 and a sump temperature sensor 114 that measures a temperature of solution 112 in sump 110, etc. Other sensors may also be included, and the disclosure is not limited in this respect.

Cleaning machine controller 120 includes one or more processor(s) and/or processing circuitry that monitors and controls operation and various cleaning process parameters of the cleaning machine 100 such as wash temperature, sump temperature, rinse temperature, wash, rinse, and dwell times and sequences, cleaning solution concentrations, timing for dispensation of one or more chemical products, amounts of chemical products to be dispensed, timing for application of water and chemical products into the wash chamber, etc. Cleaning machine controller 120 may communicate with product dispense system 130 in order to monitor and/or control the timing and/or amounts of cleaning products dispensed into cleaning machine 100.

Figure 3:
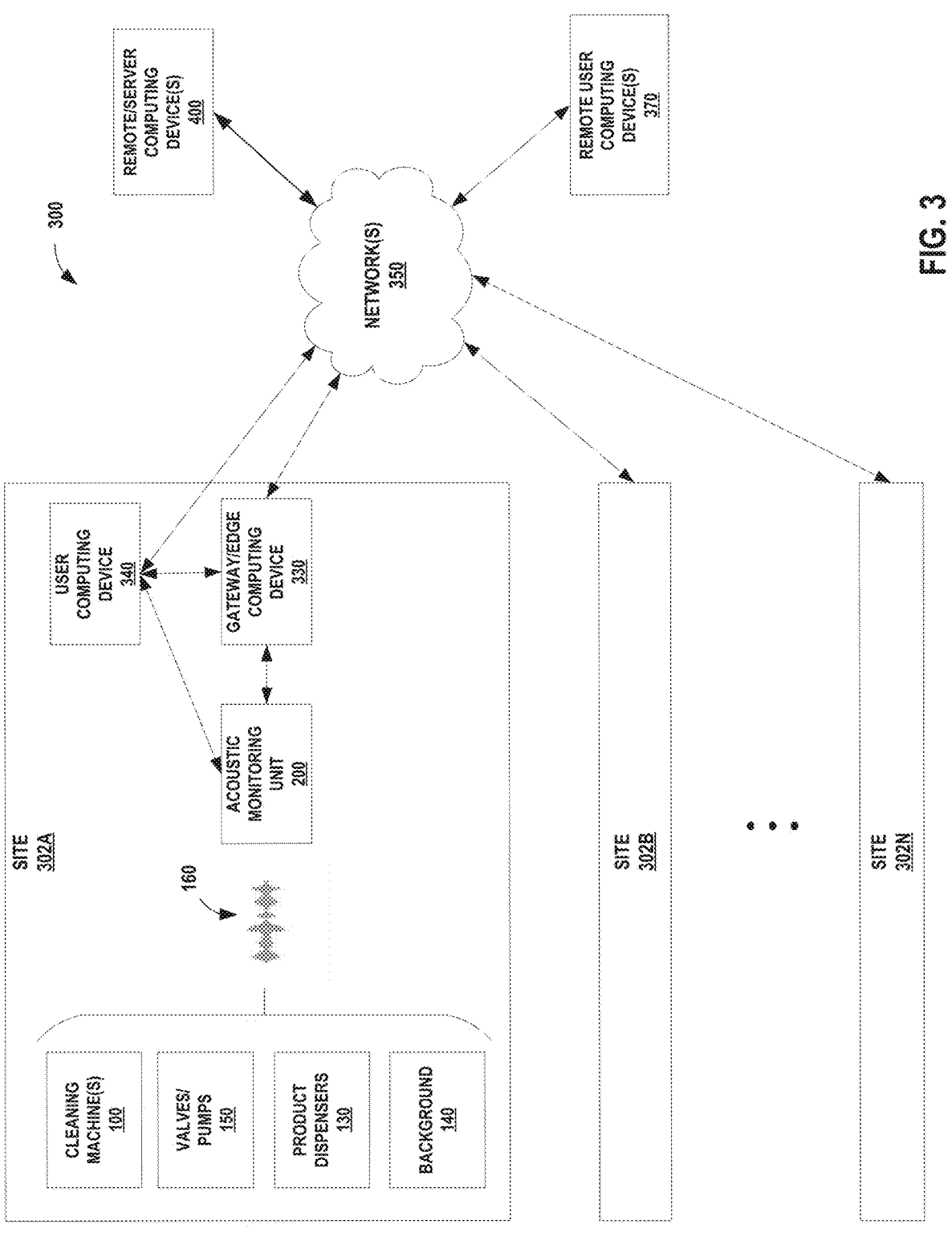
FIG. 3 is a diagram of an example system in which acoustic data is monitored to detect anomalous operation of one or more cleaning machines in accordance with one or more techniques of the disclosure.

In some examples, cleaning machine controller 120 and/ or product dispense system 130 may be configured to communicate (wired and/or wirelessly) with one or more gateway/edge computing devices, remote computing devices or cloud-based server computing systems (see, e.g., FIG. 3). Cleaning machine controller 120 and/or product dispense system 130 may also be configured to communicate with one or more local or remote user computing devices, such as tablet computers, mobile computing devices, smart phones, laptop computers, and the like.

Acoustic monitoring unit 180 includes one or more acoustic sensors and processing circuitry configured to acquire acoustic data representative of acoustic signals 160 (e.g., sounds) associated with operation of cleaning machine 100. The acoustic data may include, for example, acoustic data (e.g., sounds) associated with operation of cleaning machine 100 itself (e.g., vibrations of the machine, water movement within the machine, movement or clatter of dishes, glassware, or other articles within the machine, sounds generated by one or more motors, internal valves or pumps, etc.); acoustic data associated with one or more external valves or pumps associated with operation of cleaning machine 100 (e.g., fresh water intake, etc.); acoustic data associated with automated product dispensers (e.g., detergent, bleach or rinse aid dispensers, etc.); and/or acoustic data associated with background sounds from the surrounding environment.

In accordance with one or more techniques of the disclosure, acoustic monitoring unit 180 is configured to acquire acoustic data associated with operation of a cleaning machine during each of a plurality of sample periods. For each of the plurality of sample periods, acoustic monitoring unit 180 predicts, using a trained acoustic classifier, an operational state of the cleaning machine based on the acoustic data acquired during the respective sample period. The acoustic monitoring unit 180 further determines whether sequence(s) of one or more predicted states represent normal or anomalous operation of cleaning machine 100.

In some examples, upon determining that sequence(s) of one or more predicted states represent anomalous operation of cleaning machine 100, acoustic monitoring unit 180 is further configured to identify a root cause(s) of the anomalous operation and/or one or more remedial actions that may be taken to address and/or alleviate the root cause of the anomalous operation. Acoustic monitoring unit 180 may further generate one or more notifications for receipt by a local or remote computing device indicative of the normal or anomalous operation, the root cause(s) of the anomalous operation and/or one or more suggested remedial action(s) that may be taken in response to identification of the root cause of the anomalous operation. For example, acoustic monitoring unit 180 may generate one or more notifications indicative of the normal or anomalous operation of a cleaning machine for receipt by a user computing device associated with a service technician or territory manager responsible for servicing the cleaning machine and/or other equipment at the site. In some examples, the computing device automatically invokes one or more remedial actions in response to identification of the root cause of the anomalous operation.

In addition or alternatively, acoustic monitoring unit 180 may transmit the acoustic data associated with operation of cleaning machine 100 to one or more remotely located (e.g., cloud-based) computing devices for the determination as to whether the acoustic data represents "normal" or "anomalous" operation of cleaning machine 100. The remote computing device may further generate notification(s), perform additional analysis, automatically invoke one or more remedial actions, and/or generate reports regarding the acoustic data, the classifications, the root cause(s) of any anomalous operations detected, and/or statistics relevant to operation of cleaning machines at one or more sites.

FIG. 2 is a block diagram of an example acoustic monitoring unit 200 that monitors acoustic data associated with operation of a cleaning machine 100 and determines whether the acoustic data represents "normal" or "anomalous" operation of cleaning machine 100 based on the acoustic data. Acoustic monitoring unit 200 includes one or more processors 202, one or more user interface(s) 204, one or more communication components 206, one or more acoustic sensor(s) 208, and one or more data storage components 210. Acoustic monitoring unit 200 may be used to implement, for example, acoustic monitoring unit 180 as shown in FIG. 1.

In general, acoustic signals 160 (e.g., sounds) associated with operation of a cleaning machine deployed at a site are acquired and analyzed by acoustic monitoring unit 200. In the case where cleaning machine 100 is a dish machine as shown in FIG. 1, the site may include, for example, a commercial or restaurant kitchen. Acoustic monitoring unit 200 includes or is associated with one or more acoustic sensor(s) 208 (e.g., digital microphone(s)) configured to acquire acoustic data representative of acoustic signals 160 (e.g., sounds) associated with operation of cleaning machine 100 during each of a plurality of sample periods. Acoustic sensor(s) sample the acoustic signal 160 and store the corresponding sampled information in a storage media as represented by acoustic data 212. The samples of the acoustic signals may be acquired at a predetermined sampling frequency on a continuous, periodic (e.g., according to a schedule or at certain predetermined time(s) during the day), and/or on demand basis. In such examples, acoustic monitoring unit 200, or at least the acoustic sensor(s) associated with acoustic monitoring unit 200, are positioned at site relative to the cleaning machine such that acoustic data acquired by acoustic monitoring unit 200 is of sufficient quality to result in accurate classification of cleaning machine operation.

Acoustic signals 160 include a combination of all sounds present at the environment/site where the cleaning machine is located. The acquired acoustic data may therefore include, for example, acoustic data (e.g., sounds) associated with operation of the cleaning machine 100 itself (e.g., vibrations of the machine, water movement within the machine, movement or clatter of dishes, glassware, or other articles within the machine, sounds generated by one or more motors, internal valves or pumps, etc.); acoustic data associated with one or more external valves or pumps 150 associated with operation of cleaning machine 100 (e.g., fresh water intake, etc.); acoustic data associated with automated product dispense system 130 (e.g., detergent, bleach or rinse aid dispensers, etc.); and/or acoustic data associated with background or ambient sounds from the surrounding environment 140.

Acoustic sensor(s) 208 may include, for example, one or more digital microphones, such as a MEMS (micro-electro-mechanical sensor) microphone. In such examples, acoustic sensor 208 includes an electro-acoustic transducer housing a sensor (MEMS) and an application-specific integrated circuit (ASIC) including analog to digital conversion circuitry. The sensor converts variations in air pressure (sound waves) to capacitance variations that the ASIC transforms into a digital output. The digitized acoustic data is stored as acoustic data 212 and/or may be transmitted to one or more local or remote computing devices. Although a specific example of a MEMS microphone is described herein, any other appropriate acoustic sensor(s) including conventional microphone elements in combination with analog to digital conversion circuitry may also be used, and the disclosure is not limited in this respect.

User interface(s) 204 may include one or more of audio interface(s), visual interface(s), and touch-based interface components, including a touch-sensitive screen, display, speakers, buttons, keypad, stylus, mouse, or other mechanism that allows a person to interact with a computing device. In other examples, reporting module 216 of acoustic monitoring unit 200 functions as a mobile application that allows a user computing device to interact with acoustic monitoring unit to view acoustic data and reports on a user computing device. Communication components 206 allow acoustic monitoring unit 200 to communicate via wired and/or wireless communication with other electronic devices, such as a gateway/edge computing device located at or near the site, one or more user computing device(s) and/or other local or remote or local computing devices. In some examples, acoustic monitoring unit 200 is configured for wired and/or wireless communication and streaming of acquired acoustic data to one or more local or remote computing devices.

Storage device(s) 210 include one or more hardware and/or computer-readable memories that store acoustic data 212, an acoustic monitoring module 214, a trained acoustic classifier 218, an analysis/reporting module 216, cycle data 220, expected state sequence data 224, root cause/remedial action data 226, and data storage 222. Modules 214, 216 and/or 218 may perform operations in accordance with one or more techniques of the disclosure using software, hardware, firmware, or a mixture of hardware, software, and firmware and/or other processing circuitry residing in and/or executed by acoustic monitoring unit 200. Modules 214 and/or 218 comprise computer readable instructions that, when executed by one or more processors 202, cause acoustic monitoring unit 200 to determine whether acoustic data associated with operation of a cleaning machine represents "anomalous" or "normal" operation of cleaning machine 100. In some examples, one or more of modules 214, 216 and/or 218 may be arranged remotely to and/or remotely accessible to processors 202, for example, as one or more network services operating in a network cloud-based computing system.

Acoustic monitoring module 214 includes instructions that are executable by processor(s) 202 to perform and control various tasks in accordance with one or more techniques of the disclosure. For example, acoustic monitoring module 214 includes instructions that are executable by processor(s) 202 to initiate and/or control acquisition of acoustic data 212 associated with a site at which operation of a cleaning machine is to be monitored during each of a plurality of sample periods. For each of the plurality of sample periods, acoustic monitoring module 214 predicts, using trained acoustic classifier 218, an operational state of the cleaning machine based on the acoustic data acquired during the respective sample period. In some examples, trained acoustic classifier 218 is a trained machine learning model configured to predict one or more operational states of a cleaning machine using acoustic training data associated with normal operation of cleaning machine 100 and/or one or more types of anomalous operation of cleaning machine 100.

Acoustic monitoring module 214 further determines whether sequence(s) of one or more predicted states represent "normal" or "anomalous" operation of cleaning machine 100. For example, acoustic monitoring unit 200, upon execution of acoustic monitoring module 214, may compare the one or more sequence(s) of predicted states with one or more sequence(s) of expected states 224 for the cleaning machine. The one or more sequence(s) of expected states 224 include sequence(s) of expected states corresponding to normal operation of a cleaning machine. In some examples, the one or more sequence(s) of expected states 224 may further include sequence(s) of expected states corresponding to one or more types of anomalous operation of a cleaning machine. For example, the sequence(s) of expected states corresponding to one or more types of anomalous operation may include sequence(s) of expected states for certain types of operational faults or failures that can occur with respect to the cleaning machine. These "root causes" of the different types of anomalous operation may include, for example, mechanical faults or failures, software faults or failures, plumbing issues, dispenser out of product conditions, etc.

In some examples, upon determining that sequence(s) of one or more predicted states represent "anomalous" operation, acoustic monitoring unit 200, upon execution of acoustic monitoring module 214, identifies a root cause(s) of the anomalous operation. Each of the one or more sequence(s) of expected states 224 corresponding to anomalous operation may be associated with a different root cause of the anomalous operation. Acoustic monitoring unit 200 may further identify one or more remedial actions in response to identification of the root cause(s) of the anomalous operation. The remedial action(s) may be determined by reference to root cause/remedial action data 226, which associates each root cause with one or more remedial actions.

Any other data used or generated during monitoring of acoustic data at a site or during analysis of the acoustic data to detect anomalous operation of a cleaning machine may be stored in data storage 222.

Reporting module 216 may generate one or more notifications or reports for storage or for display on user interface(s) 204, or for receipt by one or more local or remote computing device(s). For example, acoustic monitoring unit 200, upon execution of reporting module 216, generates one or more notifications for receipt by a local or remote computing device indicative of the normal or anomalous operation of cleaning machine 100, the root cause(s) of the anomalous operation and/or suggested remedial action(s) that may be taken in response to determination of the root cause of the anomalous operation. For example, acoustic monitoring unit 180 may generate one or more notifications indicative of the normal or anomalous operation for receipt by a user computing device associated with a service technician or territory manager responsible for servicing the cleaning machine and/or other equipment at the site.

In some examples, acoustic monitoring unit 200 may, upon execution of acoustic monitoring module 214, automatically invoke one or more remedial actions in response to determination of the root cause of the anomalous operation. The one or more remedial actions may be intended to address or alleviate the root cause of the anomalous operation. In addition or alternatively, acoustic monitoring unit 200 may in some examples transmit the acoustic data associated with operation of the cleaning machine to one or more remotely located (e.g., cloud-based) computing devices for analysis and classification of the cleaning machine operation. The remote computing device may further generate notification(s) and/or perform additional analysis or generate reports regarding the acoustic data, the classifications, the root cause(s) of any anomalous operations detected, and/or statistics relevant to operation of cleaning machines at one or more sites.

FIG. 3 is a diagram of an example environment 300 in which acoustic data is collected and analyzed to determine whether acoustic data associated with operation of a cleaning machine, such as any one or more of cleaning machines 100 deployed at each of one or more sites 302A-302N, represents normal or anomalous operation of the cleaning machine, in accordance with one or more techniques of the disclosure. Each site 302A-302N includes one or more cleaning machines 100 and an acoustic monitoring unit 200. In the example of FIG. 3, each site 302A-302N includes an acoustic monitoring unit 200 and a gateway/edge computing device 330. Gateway/edge computing device 330 may in other examples be located at or near one or more site(s) to provide edge computing advantages such as increased processing speed and lower latency. One or more mobile user computing devices 340 may also be present at each site 302A-302N at various times.

In general, gateway/edge computing device 330 provides network connectivity between devices located at the respective site 302A-302N with one or more local or remote computing devise 400, 370 via one or more network(s) 350. Network(s) 350 may include, for example one or more local area networks (LANs), wireless local area networks (WLANs), virtual private networks (VPNs), wide area networks (WANs), the Internet, etc. As such, gateway/edge computing device 330 is configured to communicate with acoustic monitoring unit 200 (e.g., either wired or wirelessly or both) and to transmit acoustic data, cleaning machine operation classification data, and other notifications and/or data from acoustic monitoring unit 200 to one or more local and/or remote computing devices 400, 370. Gateway/edge computing device 330 may be further configured to communicate with the controller of the cleaning machine(s) 304, controller of the product dispenser(s) 308, and any other devices located at the respective site 302A-302N.

User computing device 340 includes, for example, a mobile computing device associated with a service technician or territory manager (TM) or service technician responsible for servicing the cleaning machines 100 and/or other equipment at the site. User computing device 340 may include, for example, any type of mobile computing device such as a smart phone, tablet computer, personal digital assistant, laptop computing device, etc. User computing device may also include any other type of local computing device present at the site such as one or more desktop computers associated with employees at the site.

In some examples, acoustic monitoring unit 200 generates one or more notifications for receipt by one or more local or remote computing device indicative of the normal or anomalous operation of the cleaning machine, the root cause(s) of any detected anomalous operation and/or suggested remedial action(s) that may be taken to address the root cause of the anomalous operation. The notification(s) may be generated at one or more times. For example, a notification may be generated each time anomalous operation is detected, to facilitate prompt communication of the anomalous operation to the appropriate service personnel and help ensure that repairs or other interventions to address the anomalous operation can be performed quickly and efficiently. As another example, a push notification concerning any detected anomalous operation may be sent by acoustic monitoring unit 200 to user computing device 340 via a mobile application (e.g., "app") present on the user computing device 340. In some examples, a push notification may be sent upon detection of an anomalous event or group of anomalous events. In other examples, a push notification(s) may be sent when presence of a user computing device 340 is detected at the site, for example, upon arrival of a service technician at a site.

In some examples, acoustic monitoring unit 200 may automatically invoke one or more remedial actions in response to the root cause of the anomalous operation. In addition or alternatively, acoustic monitoring unit 200 may in some examples transmit the acoustic data associated with operation of the cleaning machine to one or more remotely located (e.g., cloud-based) computing devices 400, 370 for analysis of the acoustic data and classification of the cleaning machine operation. The remote computing device(s) 400, 370 may further generate notification(s) and/or perform additional analysis or generate reports regarding the acoustic data, the classifications, the root cause(s) of any anomalous operations detected, and/or statistics relevant to operation of cleaning machines at one or more sites.

FIG. 4 is a block diagram of an example remote/server computing device(s) 400 configured to train one or more machine learning models to predict, for each of a plurality of sample periods, an operational state of a cleaning machine based on acoustic training data, in accordance with one or more techniques of the disclosure. Although shown as a single computing device for purposes of illustration, remote/server computing device 400 may comprise a plurality of computing devices, each configured to perform one or more of the techniques of the disclosure described herein, and the disclosure is not limited in this respect. In some examples, acoustic monitoring unit 400 is configured to perform training operations described herein with respect to remote/server computing device 360 as shown in FIG. 3. In some examples, computing device 400 further provides cloud-based acoustic monitoring services a described herein. In some examples, some or all of the functionality described with respect to computing device 400 may be implemented in gateway/edge computing device 330 as shown in FIG. 3.

Remote/server computing device(s) 400 includes one or more processors 402, one or more user interface components 404, one or more communication components 406 and one or more storage devices 408. Storage device(s) 408 include one or more hardware and/or computer-readable memories that store acoustic training data 410, machine learning tools 412, a reporting module 416, one or more trained acoustic classifiers 414, site data 420, acoustic monitoring service module 422, expected state sequence data 424, root/cause remedial action data 426, and data storage 428.

Machine learning tool(s) 412 include instructions executable by processor(s) 402 to apply machine learning techniques to acoustic training data 410 to train the one or more trained acoustic classifier(s) 414. Trained acoustic classifier(s) 414 includes instructions that are executable by processor(s) 402 (and/or acoustic monitoring unit 180/200) to predict an operational state of a cleaning machine based on the acoustic data using machine learning techniques.

Trained acoustic classifier 218/414 and/or machine learning tools 412 may include any type of machine learning algorithm or tool, such as a classification model or a regression model. Examples of machine-learning tools/models include Multinominal Logistic Regression, Linear Regression, Boosted Decision Tree, Bayes Point Machine, Naive-Bayes, Random Forest (RF), Random Forest Simplified, neural networks (NN), Deep neural networks, Support Vector Machines (SVM), and/or any other type of machine learning algorithm or tool, and the disclosure is not limited in this respect.

In some examples, computing device 400 trains one or more machine learning models, trained acoustic classifier(s) 414, based on acoustic training data 410 comprising a plurality of training inputs and a known output (e.g., predicted state) for each of the plurality of training inputs. Each of the plurality of training inputs may include acoustic data associated with operation of one or more cleaning machines during a training phase. The training phase may include one or more designed experiments and/or field tests in which acoustic data associated with operation of one or more cleaning machines is acquired. The known output for each training input may include an operational state of the cleaning machine.

Each of the plurality of training inputs includes acoustic data acquired during a corresponding one of a plurality of sample periods. The training data includes acoustic data acquired at times during which the cleaning machine is operating (e.g., the machine is executing a cleaning cycle) and at times during which the cleaning machine is not operating (e.g., idle times between execution of a cleaning cycle). In general, the acoustic data acquired during each sample period includes a combination of one or more frequencies indicative of sounds present in the environment during execution of a cleaning cycle or during idle times between execution of cleaning cycles.

The acoustic training data associated with each training input may include a label (training output) indicative of an operational state of the cleaning machine represented by the acoustic data acquired during the sample period. The operational state may be selected from a plurality of states, each state representative of a frequency or combinations of frequencies, expected to occur during execution of a normal cleaning cycle, during idle times between cleaning cycles, and/or during execution of one or more anomalous cleaning cycles. The plurality of states may also include one or more anomalous states corresponding to a frequency or combination of frequencies that do not sufficiently match any of the expected states (e.g., one or more unexpected states) or that are expected to occur during one or more types of anomalous operation of the cleaning machine. The states may include one or more normal states and one or more anomalous states. In some examples, the anomalous states include one or more expected anomalous states and one or more unexpected anomalous states. In a dish machine application, for example, the operational states may include, any one or more of the example operational states listed in Table 1, as well as any other relevant states for a dish machine.

TABLE 1

| State Label List A | Operational State - Description |
| --- | --- |
| X | Dwell/Machine Idle |
| WM | Wash Motor On |
| DPWM | Detergent Pump Active + Wash Motor On |
| DS | Drain Solenoid Active |
| RASPWM | Rinse Aid/Sanitizer Pump Active + Wash Motor On |
| FS | Fill Solenoid Active |
| FSDS | Fill Solenoid Active + Drain Solenoid Active |
| RASP | Rinse Aid/Sanitizer Pump Active |
| SPWM | Sanitizer Pump Active + Wash Motor On |
| RASPFS | Rinse Aid/Sanitizer Pump Active + Fill Solenoid Active |
| DPFSWM | Drain Pump Active + Fill Solenoid Active + Wash Motor On |
| DSWM | Drain Solenoid Active + Wash Motor On |
| SPFS | Sanitizer Pump Active + Fill Solenoid Active |
| FSWM | Fill Solenoid Active + Wash Motor On |
| A | Anomalous |

In some examples, certain of the states listed in Table 1 may be combined to reduce the total number of states to be extracted from the acoustic data acquired during each sample period and/or analyzed by the machine learning tools. Based on analysis performed on the training data using one or more machine learning tools in accordance with the present disclosure, one or more of the states may be identified as being relatively more important for accurate classification of the operation of the cleaning machine. In addition, certain combinations of the one or more states may be identified as being relatively more important to prediction of the cleaning machine state.

For example, certain sounds occurring during execution of a cleaning cycle are relatively louder (higher in amplitude) than other sounds, and when both sounds occur simultaneously during one or more sample period(s), the relatively quieter sounds may be not acoustically distinguishable during those sample period(s). In such examples, certain of the states may be combined to reduce and/or simplify the total number of states to be analyzed by the machine learning tools and/or resultant trained acoustic classifier(s).

As one example, a reduced set of operational states such as those shown in Table 2 may be determined by combining one or more of the operational states shown in Table 1. For example, where the acoustic signature (i.e., frequency response) of the chemistry pumps (e.g., detergent pump, rinse pump, sanitizer pump, etc.) are not acoustically distinguishable, states in which the Wash Motor and at least one chemistry pump are active may be combined as one state (e.g., CPWM and SPWM may be combined as CPWM). As another example, if the drain solenoid is active at the same time as the fill solenoid, the acoustic signature of the fill solenoid is louder (i.e., higher in amplitude) than that of the drain solenoid, and the FSDS state may be reduced to the FS state. If the chemistry pumps are on during the end of the fill portion of the cycle (fill solenoid is active), the RASPFS state may be reduced to the RASP state. If the fill solenoid and the wash motor are on together, the wash motor is louder and the FSWM state may be reduced to the WM state. An example of the resulting combined or reduced states are shown in Table 2.

TABLE 2

| State Label List B | Description |
| --- | --- |
| X | Dwell/Machine Idle |
| WM | Wash Motor On |
| CPWM | Chemistry Pump Active + Wash Motor On |
| DS | Drain Solenoid Active |
| FS | Fill Solenoid Active |
| RASP | Chemistry Pump Active |
| A | Anomalous |

During the training phase, the machine learning tools analyze the acoustic data acquired during each sample period (training input) and the associated operational state (e.g., training output) to train a first order machine learning model to predict an operational state of the cleaning machine based on the acoustic training data for the respective sample period.

In some examples, the acoustic training data is divided into a first subset and a second subset used to train and validate, respectively, trained acoustic classifier(s) 414. Computing device 400, executing machine learning algorithm or machine learning tool(s) 412, may train the acoustic classifier 414 by applying the first subset of the acoustic training data to find correlations among one or more features of the acoustic training data that affect accuracy of the predicted state of the cleaning machine during each sample period. In other words, the machine learning tool(s) trains acoustic classifier 414 with the first subset of the training data. Acoustic classifier 414 may be tuned, also using the first subset of the training data, to improve or maximize the model's performance. The machine-learning tools 412 applies the second subset of the training data in order to appraise or score how well acoustic classifier 414 able to predict the operational states of the cleaning machine during each sample period.

In use, the one or more trained acoustic classifier(s) 414 may be stored on an acoustic monitoring unit 180/200 (as indicated by reference numeral 218 in FIG. 2). In addition or alternatively, remote/server computing device(s) 400 of FIG. 4 may be configured to provide cloud-based acoustic monitoring services for one or more sites, such as sites 302A-302N of FIG. 3, via execution of acoustic monitoring service module 422 and trained acoustic classifiers 414.

In such examples, remote/server computer 400 stores site data 420 associated with each of sites 302A-302N. The site data 420 may include, for example, corporate information, site information, information regarding the cleaning machines deployed at each site, acoustic data associated with each cleaning machine and/or site, classification data for each cleaning machine and/or site, maintenance and/or repair information for each cleaning machine and/or site, etc.

Acoustic monitoring unit(s) 180/200 at each site 302A-302N transmits acquired acoustic data to remote/server computing device 400, which determines whether the acoustic data represents normal or anomalous operation of the cleaning machine. For example, for each of a plurality of sample periods, computing device 400 predicts, using trained acoustic classifier 414, an operational state of the cleaning machine based on the acoustic data acquired during the respective sample period.

Computing device 400 further determines whether sequence(s) of one or more predicted states represent normal or anomalous operation of the cleaning machine. For example, computing device 400, upon execution of acoustic monitoring service module 422, may compare the one or more sequence(s) of predicted states with one or more sequence(s) of expected states 424 for the cleaning machine. The one or more sequence(s) of expected states (i.e., expected state sequence data 424) include sequence(s) of expected states corresponding to normal operation of a cleaning machine. In some examples, the one or more sequence(s) of expected states 424 may further include sequence(s) of expected states corresponding to one or more types of anomalous operation of a cleaning machine. For example, the sequence(s) of expected states corresponding to one or more types of anomalous operation may include sequence(s) of expected states for certain types of operational faults or failures that can occur with respect to the cleaning machine. These "root causes" of the different types of anomalous operation may include, for example, mechanical faults or failures, software faults or failures, plumbing issues, dispenser out of product conditions, etc.

In some examples, upon determining that sequence(s) of one or more predicted states represent anomalous operation, computing device 400, upon execution of acoustic monitoring service module 422, identifies a root cause(s) of the anomalous operation. Each of the one or more sequence(s) of expected states 424 corresponding to anomalous operation may be associated with one or more root cause(s) of the anomalous operation. Computing device 400 may further identify one or more remedial actions in response to identification of the root cause(s) of the anomalous operation. The remedial action(s) may be determined by reference to root cause/remedial action data 426, which associates each root cause with one or more remedial actions.

Any other data used or generated during monitoring of acoustic data at a site or during analysis of the acoustic data to detect anomalous operation of a cleaning machine may be stored in data storage 428.

Reporting module 416 may generate one or more notifications or reports for storage or for display on a user interface of a computing device, such as a user interface of user computing device 340, or for receipt by one or more local or remote computing device(s). For example, computing device 400, upon execution of reporting module 216, generates one or more notifications for receipt by a local or remote computing device indicative of the normal or anomalous operation of the cleaning machine, the root cause(s) of the anomalous operation and/or suggested remedial action(s) that may be taken in response to determination of the root cause of the anomalous operation. For example, computing device 400 may generate one or more notifications indicative of the normal or anomalous operation for receipt by a user computing device associated with a service technician or territory manager responsible for servicing the cleaning machine and/or other equipment at the site.

In a dish machine application, example root causes of anomalous operation which may be associated with one or more sequence(s) of expected states 424 and/or stored in root cause remedial action data 426 include, but are not limited to, one or more out of product conditions (e.g., detergent, sanitizer or rinse aid out of product), one or more known types of machine faults or failures, such as clogged wash or rinse spray arms, obstructed spray arm, faulty drain valve, missing drain stopper, failing or failed wash motor, low or no water fill (faulty valve), failed heater, failed chemical pumps, etc., and/or any other type of anomalous operation for which acoustic data may be correlated with presence of the associated anomaly.

Computing device(s) 400, executing reporting module 416, may generate one or more reports and/or notifications regarding operation of one or more cleaning machines at one or more sites based on the acoustic data. The reports may be generated automatically at periodic intervals, on demand, or in response to occurrence of an event (e.g., in response to detection of anomalous operation of a cleaning machine).

In some examples, computing device 400 may, upon execution of acoustic monitoring service module 422, automatically invoke one or more remedial actions in response to determination of the root cause of the anomalous operation. The one or more remedial actions may be intended to address or alleviate the root cause of the anomalous operation. The one or more remedial actions may be intended to address or alleviate the root cause of the anomalous operation. Examples of automatic remedial/corrective actions that may be taken, include, but are not limited to, restart or reset a machine, download new machine operating parameters, restart or reset a product dispenser, temporarily shut down a machine until maintenance can be performed, activate an audible or visible warning, electronically notify the account or the service rep, display the identified problem, turn-off the machine, repeat the cleaning cycle, adjust (increase) the cycle time (wash, rinse or both), adjust the water temperature (wash, rinse or both), adjust detergent concentration, adjust rinse aid, call for chemical sanitizer, call for water softening, call for or activate sump drain & refill, call for machine deliming, indicate pending motor failure, indicate wash or rinse arm malfunction (clogged spray jet or non-rotating arm), indicate faulty sump drain operation. Indicate pending or active heater failure (heater solenoid or heater), etc.

In some examples, one or more trained acoustic classifiers 414 specific to operation of different types and/or manufacturers of cleaning machine may be generated. In the dish machine application, for example, a trained acoustic classifier may be generated for each of one or more brands/manufacturers/model of door or hood commercial dish machines, rack/conveyor dish machines, under counter dish machines, glasswashers and other special purpose dish machines, high temperature dish machines, low temperature dish machines, etc.

Figure 5:
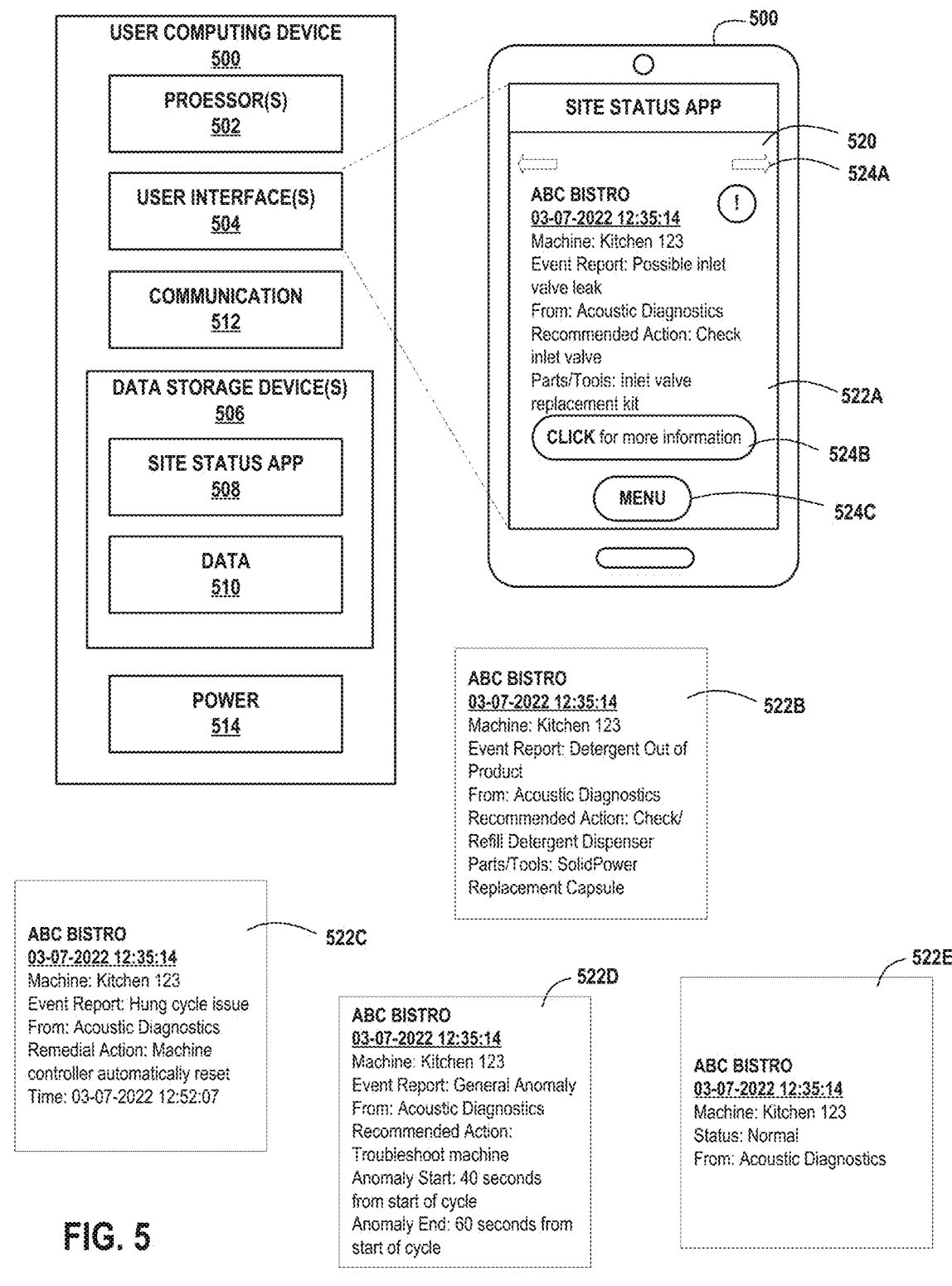
FIG. 5 is a block diagram of an example user computing device including an example site status application and example notifications that may be displayed on the user computing device in accordance with one or more techniques of the disclosure.

FIG. 5 is a block diagram of an example user computing device 500 in accordance with one or more techniques of the disclosure. User computing device 500 is one example of user computing device 340 as shown in FIG. 3. User computing device 500 may be associated with a user, such as a service technician, territory manager, employee, or other person responsible for operation or maintenance of cleaning machines at one or more sites. User computing device 500 may include a mobile computing device (e.g., smartphone, tablet, or laptop computer), a desktop computer, a wearable device such as a smartwatch, etc., or any other type of computing device. User computing device 500 is configured to communicate with one or more acoustic monitoring units 180/200 to enable the user to view notifications and/or obtain information concerning acoustic monitoring of cleaning machines at one or more sites, enter status or repair information, etc.

Example user computing device 500 includes one or more processor(s) 502, a user interface 504, a communication interface 512, data storage devices 506, and a power source 514 (e.g., one or more batteries). Communication interface 512 of user computing device 500 is configured for wireless communication with one or more acoustic monitoring unit(s) 180/200 and/or any other remote or local computing device(s). For example, communication interface 512 and acoustic monitoring unit 180/200 may be configured to communicate via any one or more of, for example, wireless (Wi-Fi) communication, Bluetooth® or Bluetooth® Low Energy (BLE), near field communication (NFC), or any other form of wireless communication.

User computing device 500 includes a site status application 508 stored in a memory or other data storage device 506 of user computing device 500. Site status application 508, when executed by the one or more processors 502 of user computing device 500, generates one or more interactive pages for display on user interface 504 of user computing device 500. The interactive pages displayed may include notifications generated by one or more acoustic monitoring unit(s) 180/200 and/or computing device(s) 360/370 concerning operation of one or more cleaning machines (e.g., cleaning machines 100 at a site or sites 302A-302N). The notifications may include, for example, information indicative of whether acoustic data associated with operation of the one or more cleaning machines represents normal or anomalous operation of the cleaning machine(s).

User interface 504 of example user computing device 500 includes a touch screen display 520 on which one or more interactive pages generated by site status application 508 may be displayed. Example interactive pages 522A-522E include notifications generated by acoustic monitoring unit 180/200 for display on a user computing device 500, in accordance with one or more techniques of the disclosure.

The interactive pages enable a user (e.g., service technician, territory manager, etc.) to view notifications and/or interact with acoustic monitoring unit 180/200 to obtain information concerning acoustic monitoring of cleaning machines at one or more sites, enter status or repair information, or otherwise view or report information concerning one or more cleaning machines at the sites.

Interactive page 522A displayed on touch screen display 520 of user computing device 500, for example, includes an example notification indicative of an anomalous operation detected by an acoustic monitoring module 180/200 at the site, "ABC Bistro." The notification includes a name of the site ("ABC Bistro"), a date and time ("03-07-2022 12:35:14") associated with the anomalous operation (e.g., a time or times at which the anomalous operation occurred or was detected), a machine identifier ("Kitchen 123"), an indication of the type or root cause of the anomalous operation ("Event Report: Possible inlet valve leak"), a means by which the anomalous operation was detected ("From: Acoustic Diagnostics"), one or more recommended actions ("Check inlet valve"), and/or a list of one or more parts or tools suggested to execute the one or more recommended actions ("Inlet valve replacement kit"). The notification may further include one or more links, buttons, navigational and/or any other user interface elements, such as user interface elements 524A-524C, enabling the user to obtain further information regarding the anomalous operation (and/ or operations of cleaning machine(s) at the site in general), such as to access or view instructions or training videos regarding further diagnostics to be performed or how to complete any recommended actions or repairs, to view status information concerning other cleaning machines or sites, to view current or historical acoustic data acquired at the site, to view current or historical notifications concerning cleaning machine operation at the site, enter repair or maintenance data, etc.

As another example, interactive page 522B includes a notification including the name of the site ("ABC Bistro"), the date and time ("03-07-2022 12:35:14") anomalous operation was detected, the machine identifier ("Kitchen 123"), an indication of the type of anomalous operation ("Event Report: Detergent Out of Product"), the means by which the anomalous operation was detected ("From: Acoustic Diagnostics"), one or more recommended actions ("Check/Refill Detergent Dispenser"), and/or a list of one or more parts or tools suggested to execute the one or more recommended actions ("Solid Power Detergent Replacement Capsule").

As another example, interactive page 522C includes an example notification that may be generated when acoustic monitoring module 180/200 automatically invokes a remedial action to address a root cause of a detected anomalous operation of a cleaning machine. Such a notification may include, for example, the name of the site ("ABC Bistro"), the date and time ("03-07-2022 12:35:14") the anomalous operation was detected, the machine identifier ("Kitchen 123"), an indication of the type of anomalous operation ("Event Report: Hung Cycle Issue"), the means by which the anomalous operation was detected ("From: Acoustic Diagnostics"), a list of automatic remedial action(s) that were taken to address the issue ("Automatic Remedial Action Event Report: Reset Machine Controller"), and/or the date and time at which the automatic remedial action was performed ("Time: 03-07-2022 12:52:07").

As another example, interactive page 522D includes an example notification generated by an acoustic monitoring unit 180/200 when the operational status of a cleaning machine is determined to be experiencing a general anomaly. In other words, "anomalous" operation of the cleaning machine was detected (that is, one or more predicted states did not substantially match one or more expected states for either normal operation of the cleaning machine or one or more expected states for a specific type of anomalous operation). In this example, the notification includes the name of the site ("ABC Bistro"), the date and time ("03-07-2022 12:35:14") the anomalous operation was detected, the machine identifier ("Kitchen 123"), an indication of the "general anomaly" operational status of the cleaning machine ("Event Report: General Anomaly"), and the means by which the normal operational status was detected ("From: Acoustic Diagnostics"). The recommended action in this example includes "Troubleshoot machine." In some examples, the notification includes further information concerning the anomaly to assist service personnel during the troubleshooting and diagnostic process. In this example, the notification includes an indication of the start and end times at which the anomaly or anomalies were detected, (e.g., "Anomaly Start: 40 seconds from start of cycle" and "Anomaly End: 60 seconds from start of cycle").

As another example, interactive page 522E includes an example notification generated by an acoustic monitoring unit 180/200 when the operational status of a cleaning machine is classified as "normal." In this example, the notification includes the name of the site ("ABC Bistro"), the date and time ("03-07-2022 12:35:14") the normal operational status was detected, the machine identifier ("Kitchen 123"), an indication of the "normal" operational status of the cleaning machine ("Status: Normal"), and the means by which the normal operational status was detected ("From: Acoustic Diagnostics").

FIG. 6 includes two graphs 610A and 610B of an example raw acoustic signal 602 over time associated with operation of a cleaning machine and a graph 620 of an example frequency spectrum corresponding to the raw acoustic data acquired during one sample period, in accordance with one or more techniques of the disclosure. Graph 610A illustrates a windowing technique by which the raw acoustic signal 602 is sampled over a plurality of successive overlapping sample periods, examples of which are labeled as sampling windows 604A, 604B and 604C. Graph 610B illustrates a windowing technique by the raw acoustic signal is sampled over a plurality of successive non-overlapping sample periods, examples of which are labeled as sampling windows 606A, 606B and 606C. The length or duration of each sampling window (e.g., time between the beginning and end of each sampling window) as well as the step or interval between the start of each sampling window determine whether the successive sampling windows overlap and the amount (e.g., duration) in which they overlap (for overlapping windows) or the interval between the end of one sampling window and the start of the next successive sampling window (for non-overlapping windows).

In some examples, acoustic monitoring unit 180/200 has sufficient processing capacity to continuously sample the raw acoustic signals using overlapping sampling windows (e.g., as shown in graph 610A) and simultaneously compute a predicted operational state of a cleaning machine for each of the overlapping sampling windows. In other examples, acoustic monitoring unit 180/200 samples the raw acoustic signal using non-overlapping sampling windows and computes a predicted state for the immediately preceding sample window during the interval (e.g., as shown in graph 610A and intervals 608A and 608B) between the immediately preceding sample window and the next successive sampling windows (e.g., the time between the end of one sampling window and the beginning of the next successive sampling window). This non-overlapping sampling method may be selected when acoustic monitoring unit 180/200 does not have sufficient processing capacity to simultaneously sample and compute the predicted states, or also in some examples in which acoustic monitoring unit 180/200 does have sufficient processing capacity for simultaneous sampling/prediction, and the non-overlapping method maybe selected for other reasons (e.g., overlapping windows are not required to yield accurate predicted states or non-overlapping windows yield more accurate predicted states). However, any of the aforementioned sampling techniques, as well as other sampling techniques known in the art may be used, and the disclosure is not limited in this respect.

Graph 620 shows an example frequency spectrum 650 or plot of power (y-axis) versus frequency (x-axis) corresponding to acoustic data acquired during an example sample period, in accordance with one or more techniques of the disclosure. The frequency spectrum corresponding to each sample period represents the frequencies present in the environment during the sample period. During training of one or more acoustic classifiers, machine learning tools may use, for example, Fourier techniques to compute the frequency spectrum for each sample period. In accordance with one or more techniques of the disclosure, machine learning techniques are used to extract one or more features 622 of the frequency spectrum for each sample period that are indicative of the known operational state of the cleaning machine. For example, for each sampling period, the frequency spectrum over a range of interest may be divided into one or more frequency "bins" or intervals. The bins may be adjacent or overlapping. Various statistics may be computed for each of the one or more frequency bins, and machine learning techniques may be applied to determine which (if any) of these features for each frequency bin are predictive of the operational state of the cleaning machine.

In a dish machine example, the one or more operational states may include the example states listed in Table 1 or Table 2 above, or other appropriate operational states (including one or more normal operational states and/or one or more anomalous operational states). During a deployment phase, an acoustic monitoring unit 180/200 including one or more trained acoustic classifiers may use Fourier techniques to compute the frequency spectrum for each sample period and extract one or more features of the frequency spectrum for each sample period, and apply those features to the trained acoustic classifier(s) to predict the operational state of the cleaning machine for each sample period.

Figure 7A:
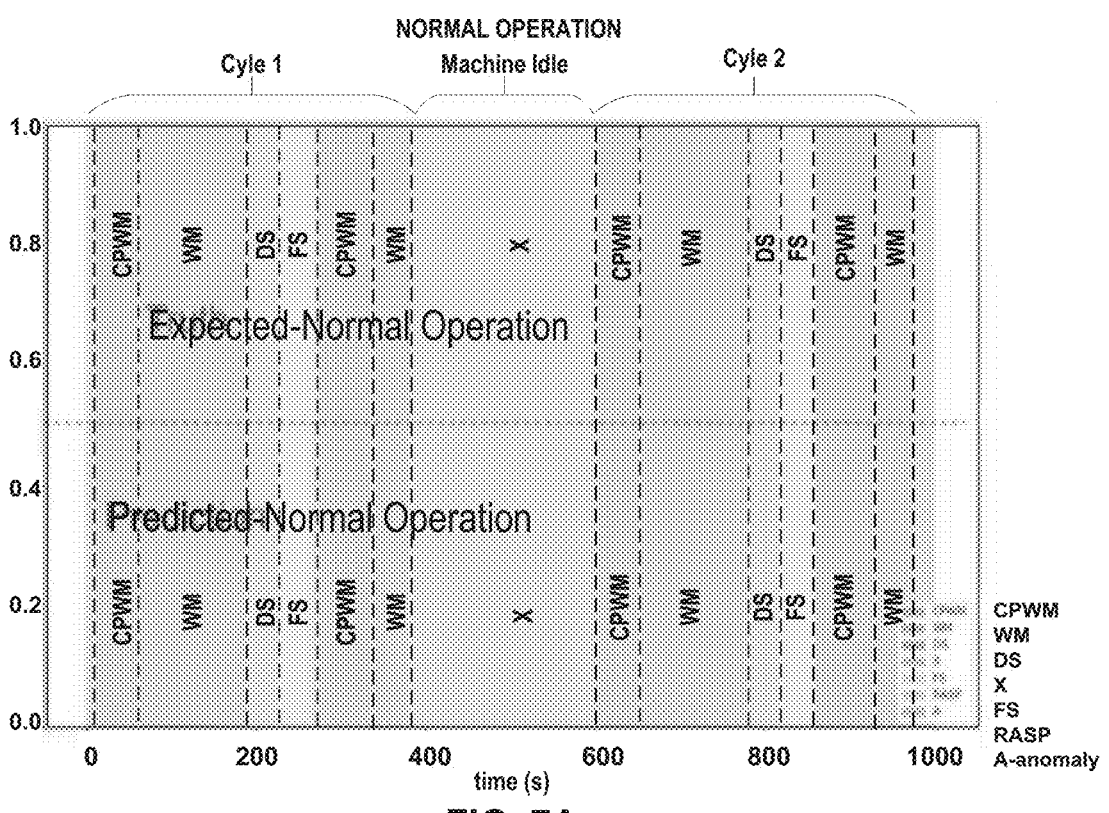
FIG. 7A is a graph showing example expected and predicted operational states of a cleaning machine during normal operation over two cleaning cycles in accordance with one or more techniques of the disclosure.

FIG. 7A is a graph showing example ground truth (expected) and predicted operational states of a cleaning machine during normal operation over the course of two cleaning cycles (labeled Cycle 1 and Cycle 2) in accordance with one or more techniques of the disclosure. Each example cleaning cycle had a total duration of about 400 seconds (about 6.7 minutes). A machine idle time having a duration of about 200 seconds (about 3.3 minutes) occurred between the two cycles.

In this example, the operational states correspond to those shown and described above with respect to Table 2. In this example, one of the states, labeled "A" in this example, is an anomalous state. The upper half of FIG. 7A shows an expected operational state sequence corresponding to normal operation of a cleaning machine over the course of two cleaning cycles, labeled Cycle 1 and Cycle 2. The lower half of FIG. 7A shows predicted operational state sequence corresponding to normal operation of the cleaning machine over the course of the two cleaning cycles. During a normal cleaning cycle, the sequence of the predicted states for a cleaning cycle being analyzed (lower half of FIG. 7A) substantially match the sequence of expected states corresponding to a normal cleaning cycle (upper half of FIG. 7A). In such examples, by comparing the sequence and duration of the predicted states to the sequence of expected states for a normal cleaning cycle, a computing device may determine that the acoustic data represents normal operation of the cleaning machine.

For example, an expected state sequence for normal operation of a 70 second dish machine cycle may look like the following:

| Expected State Sequence | Expected Duration (70 second cycle) |
|---|---|
| 1) Wash Motor + Detergent Pump | 6 seconds |
| 2) Wash Motor | 30 seconds |
| 3) Drain Solenoid | 10 seconds |
| 4) Fill Solenoid | 10 seconds |
| 5) Wash Motor + Sanitizer Pump + Rinse Aid Pump | 6 seconds |
| 6) Wash Motor | 8 seconds |

Similarly, one or more sequences of "expected" states for anomalous cleaning cycles may also be determined. For example, one or more sequences of expected states for anomalous conditions that are known to occur may be developed based on experimental data and sequences of operational states obtained for a plurality of experimental cleaning machine cycles for which the anomalous condition occurred and/or based on field data and sequences of operational states obtained for a plurality of cleaning machine cycles executed at one or more sites. In addition, the sequences of expected states for normal and/or anomalous cleaning machine cycles may be periodically updated based on data obtained from data obtained by experimentation or by data obtained from the field. In this way, the sequences of expected states for normal and/or one or more types of anomalous operation may be periodically updated over time as more acoustic data is gathered from a plurality of cleaning machines located in a variety of locations and which are subject to different acoustic environments.

Because the acoustic classifier is trained on acoustic data acquired when the cleaning machine is idle (e.g., acoustic data acquired when no dish machine sounds and only background sounds are present), the acoustic classifier is also able to accurately classify the state of the cleaning machine during sampling periods when the machine is idle. The acoustic classifier is trained using training data acquired over one or more periods of time including execution of a plurality of normal cleaning cycles (including idle times between cycles) and is thus trained to recognize sequence(s) of one or more expected states (including the expected duration of each state during execution of a normal cleaning cycle, expected sequences of states during execution of a normal cleaning cycle, etc.) indicative of normal operation of a cleaning machine. By recognizing sequence(s) (e.g., patterns) of one or more expected states for a plurality of sample periods, the acoustic classifier is in some examples able to identify the start and end of each cleaning cycle, as well as idle times between cleaning cycles.

Figure 7B:
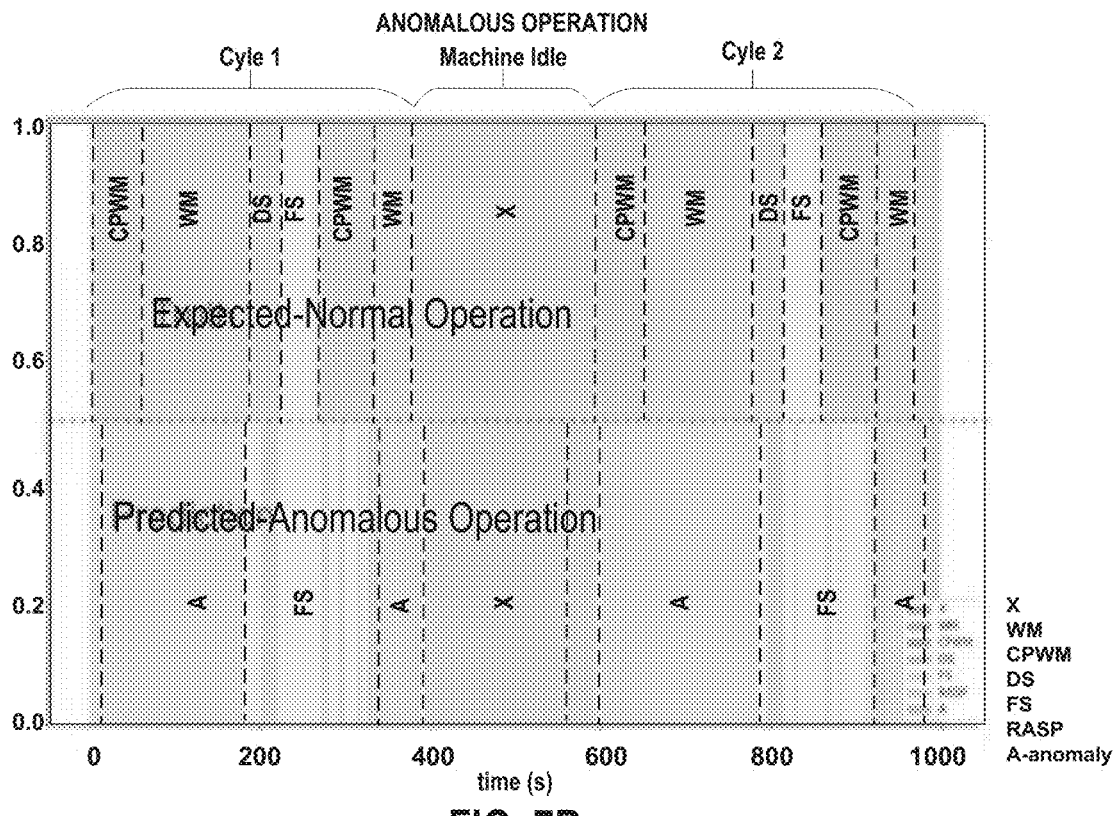
FIG. 7B is a graph showing example expected and predicted operational states of a cleaning machine during anomalous operation over two cleaning cycles in accordance with one or more techniques of the disclosure.

FIG. 7B is a graph showing example expected (upper half) and predicted (lower half) operational states of a cleaning machine during anomalous operation over two cleaning cycles in accordance with one or more techniques of the disclosure. In this example, one of the states, labeled "A" in this example, is an anomalous state. The upper half of FIG. 7B shows expected operational states corresponding to normal operation of a cleaning machine over the course of two cleaning cycles, labeled Cycle 1 and Cycle 2. The lower half of FIG. 7B shows predicted operational states corresponding to anomalous operation of the cleaning machine over the course of the two cleaning cycles. A comparison of the expected operational states (upper half of FIG. 7B) with the actual predicted operational states (lower half of FIG. 7A) shows that one or more of the predicted states for the cleaning cycle being analyzed (lower half of FIG. 7B) do not substantially match the expected states corresponding to a normal cleaning cycle (upper half of FIG. 7B). For example, the sequence of predicted states for the cleaning cycle do not substantially match the sequence of expected states corresponding to normal operation. In such examples, a computing device may determine that the acoustic data represents anomalous operation of the cleaning machine.

As discussed above, acoustic monitoring may be configured identify one or more root causes of the detected anomalous operation of the cleaning machine. Therefore, in addition to the sequence of one or more states corresponding to normal operation of a cleaning machine as shown in the top halves of FIGS. 7A and 7B, a computing device, such as acoustic monitoring unit 180/200 and/or computing device 360/370 may store sequence(s) of one or more states corresponding to each of several different types of anomalous operation of the cleaning machine.

The root causes that may be identified may include, but are not limited to, any one or more of the following: one or more out of product conditions (e.g., detergent, sanitizer or rinse aid out of product), one or more known types of machine faults or failures, such as clogged wash or rinse spray arms, obstructed spray arm, faulty drain valve, missing drain stopper, failing or failed wash motor, low or no water fill (faulty valve), failed heater, failed chemical pumps, etc., and/or any other type of root cause of anomalous operation that may be detected based on acoustic data.

FIG. 8A is a flowchart illustrating an example process (800) by which a computing device, using a trained acoustic classifier, classifies operation of a cleaning machine based on acoustic data associated with operation of the cleaning machine in accordance with one or more techniques of the disclosure. The computing device may include, for example, acoustic monitoring unit 180/200 and/or remote/server computing device 360/400 executing trained acoustic classifier(s) 218/414.

For each sample period, the computing device obtains acoustic data associated with operation of a cleaning machine acquired during a sample period (802). The acoustic data may include, for example, acoustic data representative of sounds present at a site where the cleaning machine is deployed. As such, the acoustic data may include any sound occurring in the environment where the cleaning machine is located, both during execution of a cleaning cycle and also during times when the cleaning machine is idle. The acoustic data may be acquired on a generally continuous basis. The acoustic data acquired during each sample period may include data associated with sounds present in the environment during operation of the cleaning machine (e.g., the acoustic data includes sounds associated with execution of a cleaning cycle plus any background noise present at the site) or data associated with sounds present in the environment when the cleaning machine is in a dwell or idle state (e.g., when the machine is not executing a cleaning cycle, the acoustic data includes background noise only).

The computing device extracts, based on a trained acoustic classifier, one or more features from the acoustic data (804). For example, the features may include characteristic frequency information corresponding to one or more states of the cleaning machine. In a dish machine example, the states may include one or more of a machine dwell or idle state, a wash motor on state, a chemistry pump active and wash motor on state, a drain solenoid active state, a fill solenoid active state, a chemistry pump active state, and at least one anomalous state. Other or additional states may include those shown in, for example, Tables 1 and 2 herein, or other states appropriate for the particular cleaning machine or type of cleaning machine.

For each sample period, the computing device predicts, using the trained acoustic classifier, a state of the cleaning machine based on the acoustic data acquired for the respective state (806). In some examples, the computing device smooths the sampled acoustic data by determining a moving average of an integer number of the most recent predicted states. The moving average smooths a series of predicted states into a predicted state corresponding to a longer unit of time. The integer number of states over which the moving average is determined may include, for example, between 5 and 10 states; however, any appropriate number of states may be used, and the disclosure is not limited in this respect. In addition, rather than determining a moving average, the computing device may use any other method of smoothing the data, or in some examples need not necessarily smooth the data, and the disclosure is not limited this respect.

The computing device determines whether sequence(s) of one or more predicted states represent anomalous operation of the cleaning machine (808). For example, the computing device may compare sequence(s) of one or more predicted states with sequence(s) of one or more expected states for at least a portion of a cleaning cycle to determine whether the sequence(s) of predicted states represent normal or anomalous operation of the cleaning machine. For example, the computing device may compare the sequence(s) of one or more predicted states with one or more sequence(s) of expected states for normal operation of the cleaning machine to determine whether the sequence(s) of predicted states represent normal or anomalous operation of the cleaning machine. If the sequence(s) of predicted states substantially match the sequence(s) of expected states for normal operation, the operation may be determined to be "normal." If the sequence(s) of predicted states do not substantially match the sequence(s) of expected states for normal operation, the operation may be determined to be "anomalous." In some examples, the computing device may compare the sequence(s) of one or more predicted states with one or more sequence(s) of expected states for anomalous operation of the cleaning machine to determine whether the sequence(s) of predicted states represent anomalous operation of the cleaning machine. For example, if the sequence(s) of predicted states substantially match the sequence(s) of expected states for a first type of anomalous operation, the operation may be determined to be a first type of "anomalous" operation corresponding to a first root cause (e.g., fault, failure, etc.). If the sequence(s) of predicted states do not substantially match the sequence(s) of expected states for the first type of anomalous operation, the computing device may determine if the sequence(s) of predicted states substantially match the sequence(s) of expected states for other types of anomalous operation. If the sequence(s) of predicted states do not substantially match the sequence(s) of expected states for normal operation or for any of the types of anomalous operation, the computing device may classify operation of the cleaning machine as a general "anomalous" classification.

If the computing device determines that the sequence(s) of predicted states for at least a portion of the cleaning cycle represent anomalous operation of the cleaning machine (YES branch of 810), the computing device stores the anomalous state information for the sequence(s) of predicted states (812). If the computing device determines that the sequence(s) of one or more predicted states for at least a portion of the cleaning cycle do not represent anomalous operation (NO branch of 810), the computing device stores the normal state information for the sequence(s) of predicted states (814).

The computing device determines whether a complete cleaning cycle has been detected (816). In some examples, the computing device, when determining whether a complete cleaning cycle has been detected (816) is configured to identify boundaries (e.g., start time and end time) of a cleaning cycle even when one or more anomalous states are detected. For example, the computing device may compare sequence(s) of one or more predicted states with sequence(s) of one or more expected states for a complete cleaning cycle (either normal or anomalous) to determine whether a complete cleaning cycle has been detected. In some examples, such as cleaning cycles including all or substantially all "normal" states, the sequence(s) of one or more predicted states for a complete cleaning cycle are substantially the same as (that is, substantially match) the sequence(s) of one or more expected states corresponding to normal operation of a complete cleaning cycle. In other examples, such as cleaning cycles including one or more "anomalous" states, the sequence(s) of one or more predicted states will not match at least some of the sequence(s) of one or more expected (normal) states for the complete cleaning cycle. In some examples, if one or more anomalous states are detected, the computing device may compare sequence(s) of one or more predicted states with sequence(s) of one or more expected states for a complete cleaning cycle including one or more types of anomalous operation to determine whether a complete cleaning cycle has been detected. That is, the computing device is configured to recognize sequences of one or more expected states corresponding to certain types of anomalous operation of a cleaning machine. In some examples, the computing device is configured to recognize or detect a complete cleaning cycle based on prediction of one or more sequences of idle states having at least a predetermined duration. For example, upon detection of a sequence of idle states having a duration of at least a predetermined amount of time (e.g., at least 10 seconds or other appropriate predetermined amount of time), the computing device may determine that the sequence of idle states corresponds to an idle time between cleaning machine cycles, and may identify an end time of a previous cleaning cycle and/or a start time of a subsequent cleaning cycle based on the sequence of one or more idle states.

If a complete cycle has been detected (YES branch of 814), the computing device stores the normal or anomalous state information for the completed cycle (816). The state information for each cleaning cycle may include one or more of the raw acoustic data acquired for the cleaning cycle, start and end dates and/or times for the cleaning cycle, data indicative of the frequency spectrum of the acoustic data acquired for each sample period, data indicative of the one or more features of the frequency spectrum extracted for each sample period, data indicative of the predicted state of the cleaning machine for each sample period, data indicative of the normal or anomalous operation for the cleaning machine cycle, start and/or end times associated with any anomalous states or predicted sequence(s) of states, and/or any other data acquired or generated during analysis of the acoustic data, prediction of one or more states for the cleaning cycle, and/or identification of normal or anomalous operation for the cleaning cycle.

In some examples, the computing device continuously monitors and analyzes acoustic data associated with operation of the cleaning machine acquired during each sample period (e.g., continuously repeats steps 802-816). In other examples, the computing device monitors and analyzes acoustic data associated with operation of the cleaning machine during certain defined time periods (such as for example, during hours of operation of a facility where the cleaning machine is located) or on a scheduled, periodic, or on demand basis.

Figure 8B:
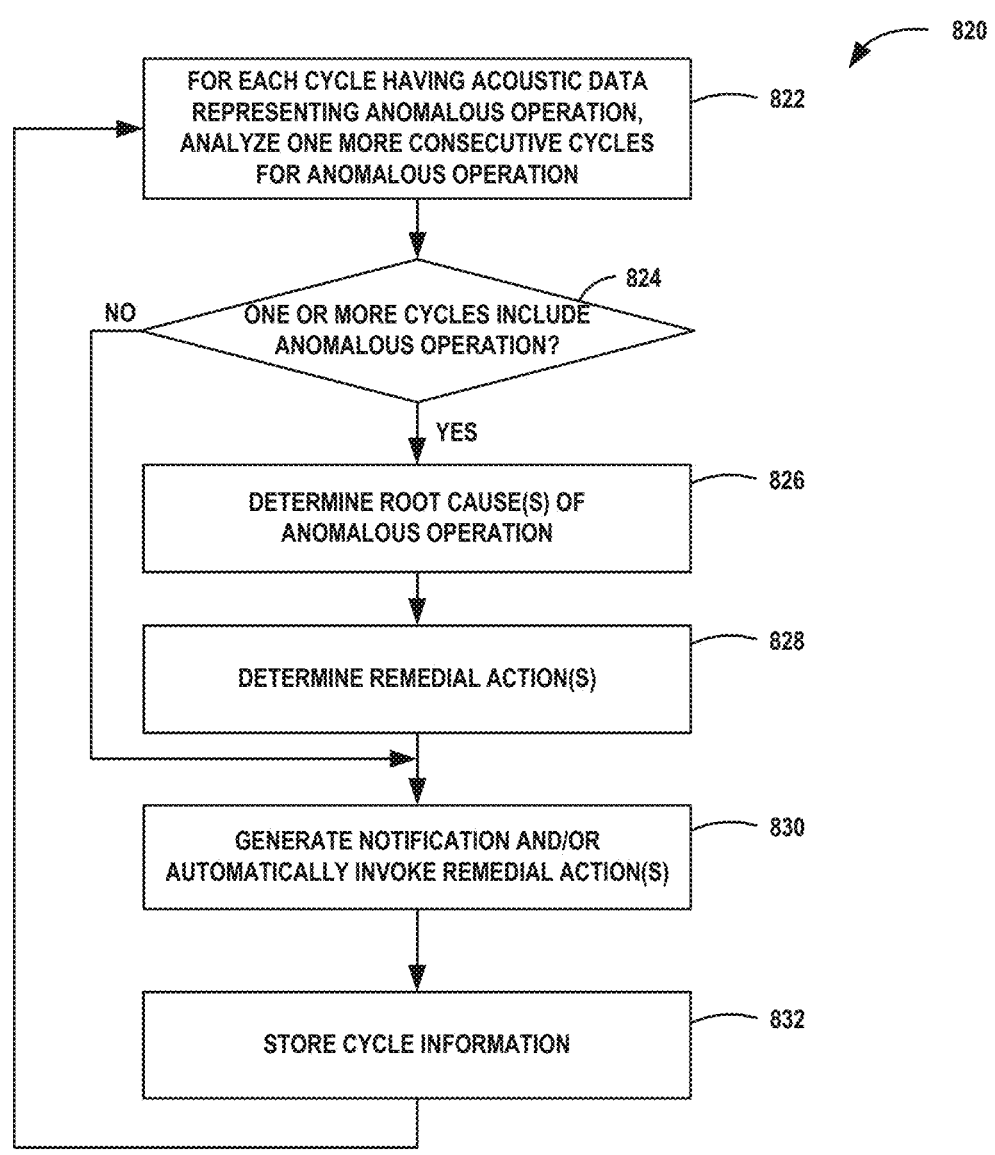
FIG. 8B is a flowchart illustrating an example process by which a computing device, using a trained acoustic classifier, analyzes anomalous operation information associated with one or more cleaning cycles of a cleaning machine to detect anomalous operation of the cleaning machine in accordance with one or more techniques of the disclosure.

FIG. 8B is a flowchart illustrating an example process (820) by which a computing device analyzes information associated with one or more cleaning cycles of a cleaning machine, in accordance with one or more techniques of the disclosure. For each cleaning cycle identified as having acoustic data representing anomalous operation (e.g., as determined using process (800) as shown in FIG. 8A), the computing device analyzes one or more consecutive cycles for anomalous operation (822). In some examples, the number of cycles over which the analysis is performed includes between 5 and 10 cycles; however, any appropriate number of cycles may be used, and the disclosure is not limited in this respect. In addition, the computing device may use any other method of analyzing one or more anomalous cycles. Analyzing multiple consecutive cycles for anomalous operation may help reduce false positives in which the computing device incorrectly indicates presence of one or more anomalies during operation of a cleaning machine where no anomalies were actually present, where the anomalies are self-correcting or for anomalies that are otherwise corrected quickly. In some cases, for example, a cleaning machine may experience one or two isolated cleaning cycles that are classified as "anomalous" and subsequent cleaning cycles that are classified as "normal." By requiring classification of multiple cycles as anomalous, the techniques of the disclosure can help reduce such false positives, thus reducing costs incurred by unnecessary dispatching of a service technician to address the false positive anomalies. In such examples, the acoustic monitoring unit may reclassify the previous incorrectly classified anomalous cleaning cycles as "normal."

If the computing device determines that the one or more consecutive cycles do not represent anomalous operation (NO branch of 824), the computing device may generate a notification concerning the normal operation (e.g., as indicated by reference numeral 522E as shown in FIG. 5) (830). The computing device stores the data associated with the normal cleaning machine operation (832) and continues to monitor and analyze the acoustic data acquired for the next cycle (822 etc.).

In some examples, if the computing device determines that one or more consecutive cycles represent anomalous operation of the cleaning machine (YES branch of 824), the computing device may further determine one or more root causes of the anomalous operation (826). For example, the computing device may determine one or more root causes of the anomalous operation based on one or more sequence(s) of predicted states for the cleaning cycle. In some examples, to determine a root cause of the anomalous operation (826), the computing device may refer to root cause association data stored in a database, such as data storage 222 as shown in FIG. 2. The root cause association data may include, for example, one or more database structures that associate one or more types of anomalous operation and/or sequence(s) of predicted states with one or more potential root causes of the anomalous operation.

The computing device may further determine one or more remedial actions in response to the identified root cause(s) of the anomalous operation (828). In some examples, to determine a remedial action, the computing device may refer to root cause association data stored in database, such as data storage 222 as shown in FIG. 2, root cause/remedial action data 226/426 as shown in FIGS. 2 and 4. The root cause association data may include, for example, one or more database structures that associate one or more root cause(s) with one or more remedial actions that may be suggested and/or automatically invoked in response to the identified root cause.

The computing device may further generate a notification including an indication of normal or anomalous operation for each of one or more cleaning cycles, one or more identified root causes of the anomalous operation, and/or one or more remedial actions that may be taken in response to the identified the root cause(s) of the anomalous operation (830). In some examples, the computing device may, in addition or alternatively, automatically invoke one or more remedial actions in response to the identified root causes of the anomalous operation (830). The computing device may continuously repeat process (820) for the cleaning machine, monitoring and analyzing acoustic data for anomalous cleaning machine operation, determine root cause(s) of anomalous operation, generate notification(s) and/or automatically perform remedial actions to address or alleviate the anomalous operation.

The techniques of the disclosure provide one or more technical advantages and practical applications. For example, analysis of acoustic data associated with operation of a cleaning machine to detect anomalous operation as described herein increases the likelihood that anomalous operation(s) of one or more cleaning machines is quickly and accurately identified. By quickly identifying anomalous operation, the techniques of the disclosure further help to ensure that notifications of anomalous operation are efficiently communicated to the appropriate management and/or service personnel, so that preventive and/or corrective maintenance can be performed. In this way, the techniques help to ensure that equipment faults or failures are addressed quickly, reducing equipment downtime and preventing further worsening of the problem. In addition, by identifying one or more root causes of the anomalous operation, the techniques further simplify and reduce the time required to perform preventive or corrective maintenance. In some examples, the techniques of the disclosure automatically invoke one or more remedial actions in response to identification of the root cause of the anomalous operation, thus increasing operational efficiency and reducing the need for performance of on-site manual maintenance activities. The techniques of the disclosure can thus prevent or reduce the severity of equipment failures, unexpected downtime, costly repairs, and food safety concerns that can arise when cleaning equipment is not functioning properly.

Figure 9:
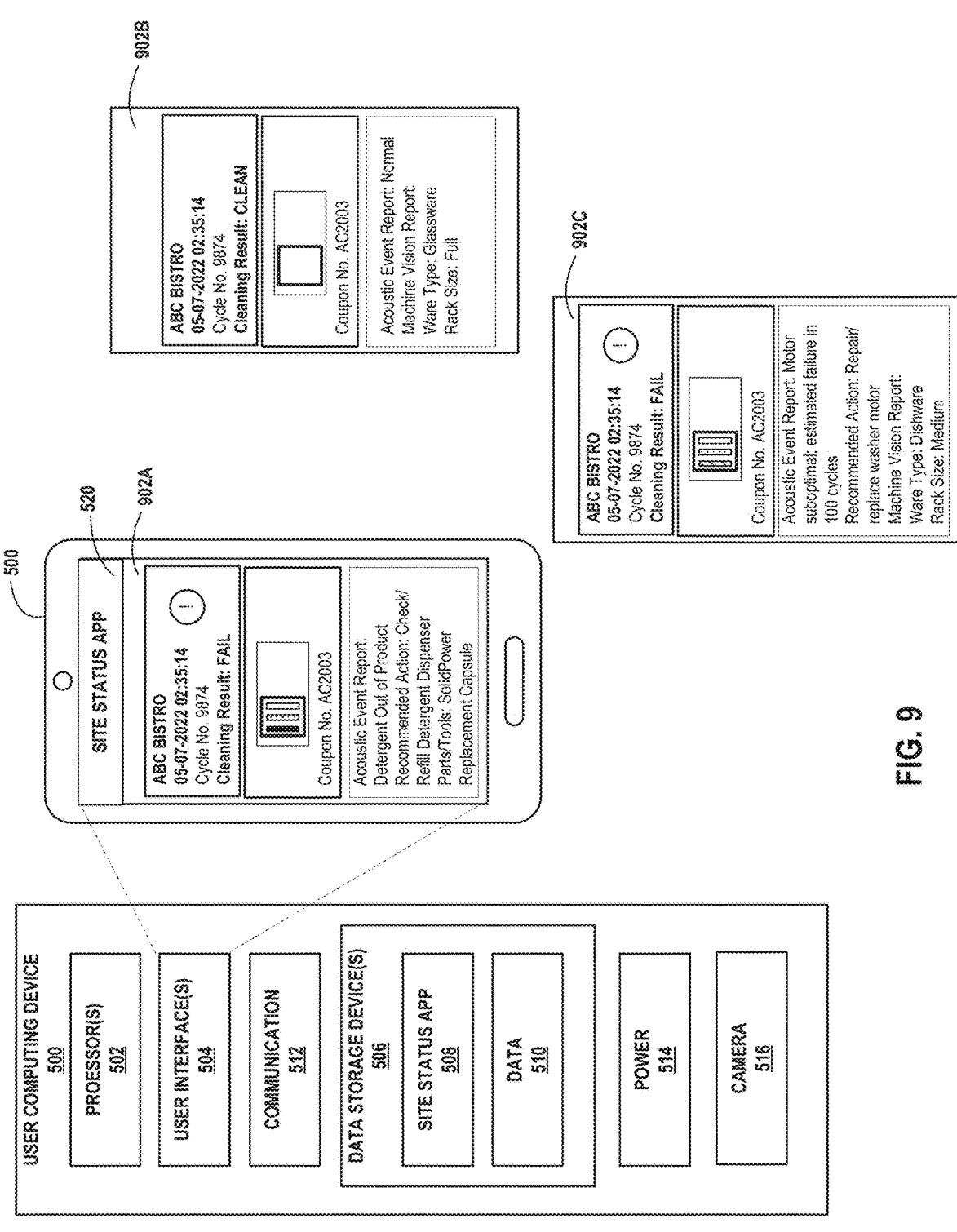
FIG. 9 is a block diagram of an example user computing device including an example site status application and additional example notifications that may be displayed on the user computing device in accordance with one or more techniques of the disclosure.

FIG. 9 is a block diagram of an example user computing device including an example site status application and additional example notifications that may be displayed on the user computing device in accordance with one or more techniques of the disclosure. In some examples, the acoustic monitoring techniques of the present disclosure may form part of a cleaning performance platform including multiple technologies with the goal of providing insights into various aspects of cleaning machine performance and ensuring consistently high levels of cleaning performance for a plurality of cleaning machines deployed at a plurality of sites. In a commercial dish machine application, for example, the cleaning performance platform seeks to ensure consistently clean racks of dishes at each of a plurality of customer sites. The cleaning performance platform may include, for example, acoustic monitoring techniques as described herein, machine vision enabled by cameras installed within the washing chamber of the cleaning machines, and use of washer indicators (e.g., coupon indicators).

Example techniques for verification of cleaning process efficacy using washer indicators (e.g., coupon indicators) and/or automatic assessment and control of cleaning process parameters are described in U.S. patent application Ser. No. 16/148,628, filed on Oct. 1, 2018, U.S. patent application Ser. No. 16/599,033, filed on Oct. 10, 2019, U.S. patent application Ser. No. 17/108,894, filed on Dec. 1, 2020, and U.S. patent application Ser. No. 17/193,314, filed on Mar. 5, 2021, each of which is incorporated by reference herein in its entirety.

Example techniques for monitoring and control of cleaning machines using machine vision is described in U.S. patent application Ser. No. 17/018,363, filed on Sep. 11, 2020, which is incorporated by reference herein in its entirety.

Example techniques for monitoring and control of thermal sanitization in automated cleaning machines is described in U.S. patent application Ser. No. 17/193,507, filed on Mar. 5, 2021, which is incorporated by reference herein in its entirety.

Example techniques for monitoring and control of cleaning process parameters in automated cleaning machines is described in U.S. patent application Ser. No. 17/193,189, filed on Mar. 5, 2021, which is incorporated by reference herein in its entirety.

Use of washer indicators to verify cleaning machine performance can help to simplify cleaning machine set up at the time of installation, verify dish machine performance during routine scheduled maintenance and provide a visual cue for field service technicians and/or the customer as to the cleaning process performance of one or more dish machines. In addition, image data or other data indicative of the amount of soil removed from/remaining on cleaning process coupons may be used to train one or more machine learning models to predict, based on one or more cleaning process parameters, cleaning outcomes of a novel cleaning machine cycle based on the cleaning process parameters used during the novel cleaning cycle. As shown in FIG. 9, the image data may be captured, using, for example, a camera 516 of user computing device 500 (e.g., a smartphone) executing site status application 508 (e.g., a mobile app). For example, site status application 508 may, when executed by one or more processors 502 of user computing device 500, generate one or more user interfaces for display on the user computing device that guide a user through an image capture procedure (see, e.g., FIG. 10D).

In this way, in some examples, cleaning performance of a cleaning machine can be evaluated using a coupon indicator and mobile app on a smartphone. This process may be used during machine installation to help determine whether a dish machine has been set up to provide optimal cleaning for a customer. This process may also be used during routine service calls to determine whether the dish machine is maintaining good cleaning performance. For example, site status application 508 may further generate, for display on a user interface of the user computing device, one or more notifications including information identifying the cleaning process (e.g., a machine id, cycle id, date/time, etc.), a predicted assessment of the cleaning process (e.g., pass/fail, clean/not clean, a cleaning process score, etc.) determined based on one or more cleaning process parameters for the cycle, an image of a coupon indicator that was subjected to the cleaning process (if any), information recommending specific machine cleaning process parameter adjustments (e.g., adjust detergent/sanitizer/rinse aid amounts, duration of cleaning cycle, water temperature, water hardness, etc.), information provided by the machine vision system and cameras inside the machine (e.g., the type of ware, fullness of the rack, type of soil on the wares, etc.), the results of the acoustic monitoring techniques as described herein, and any other relevant cleaning process information.

As shown in FIG. 9, for example, user interface 504 of example user computing device 500 includes a touch screen display 520 on which one or more interactive pages generated by site status application 508 may be displayed. Example interactive pages 902A-902C include information generated by acoustic monitoring unit 180/200 for display on a user computing device 500 such as described herein, in accordance with one or more techniques of the disclosure. In these examples, interactive pages 902A-902C further include information generated by a machine vision module (e.g., machine vision module 429 as shown in FIG. 4) and information generated by a cleaning process assessment module (e.g., cleaning process assessment module 427 as shown in FIG. 4). The interactive pages enable a user (e.g., service technician, territory manager, etc.) to view notifications and/or interact with acoustic monitoring unit 180/200, machine vision module 429 and/or cleaning process assessment module 427 to obtain a wide variety of cleaning performance information concerning one or more cleaning machines at the sites.

For example, interactive page 902A includes an example notification indicative of a name of the site ("ABC Bistro"), a date and time associated with the cycle ("05-07-2022 02:35:14"), a cycle identifier ("9874"), a cleaning process performance assessment for the cycle ("FAIL"), an image of a verification coupon indicator that was subjected to the cleaning process, a notification indicative of the type or root cause of the anomalous operation ("Event Report: Detergent Out of Product"), one or more recommended actions ("Check/Replace Detergent Dispenser"), and/or a list of one or more parts or tools suggested to execute the one or more recommended actions ("Solid Power Replacement Capsule").

As another example, interactive page 902B includes an example notification indicative of a name of the site ("ABC Bistro"), a date and time associated with the cycle ("05-07-2022 02:35:14"), a cycle identifier ("9874"), a cleaning process performance assessment for the cycle ("CLEAN"), an image of a verification coupon indicator that was subjected to the cleaning process, a notification indicative of an acoustic assessment of the cleaning process ("Normal"), information indicative of a machine vision report including the ware type and the rack size ("Ware Type: Glassware" and "Rack Size: Full").

As another example, interactive page 902C includes an example notification indicative of a name of the site ("ABC Bistro"), a date and time associated with the cycle ("05-07-2022 02:35:14"), a cycle identifier ("9874"), a cleaning process performance assessment for the cycle ("FAIL"), an image of a verification coupon indicator that was subjected to the cleaning process, a notification indicative of an acoustic assessment of the cleaning process ("Motor suboptimal; estimated failure in 100 cycles"), a recommended action ("Repair/replace washer motor"), information indicative of a machine vision report including the ware type and the rack size ("Ware Type: Dishware" and "Rack Size: Medium").

The cleaning performance platform of the present disclosure including acoustic monitoring, machine vision and/or use of washer indicators along with a mobile application to assess dish machine performance status simplifies field service tasks and enables consistent cleaning performance of cleaning machines deployed at a plurality of sites. The use of washer indicators and a smart phone app reduces the complexity of determining which variables might be influencing cleaning performance and provides immediate recommendations for specific machine adjustments to one or more machine operating parameters that can made by field associates or other users at the site and/or that can be automatically applied to the dish machine. The process also reduces the need to perform manual titrations that measure the alkalinity of a dish machine sump and/or other manual assessments that need to be conducted with respect to dish machine performance. Reducing the need for manual titrations and/or other manual assessments provides a safety improvement and time savings during routine service calls. Use of the washer indicators together with a smart phone app also offers a new opportunity for the way our dish machines might be programmed to deliver more accurate detergent dosing, which has the potential to significantly reduce variation in detergent consumption across customers, thus not only optimizing cleaning process performance but also optimizing detergent consumption and reducing costs associated with using too much detergent or other chemical cleaning products.

Figures 10A, 10B, 10C, 10D:
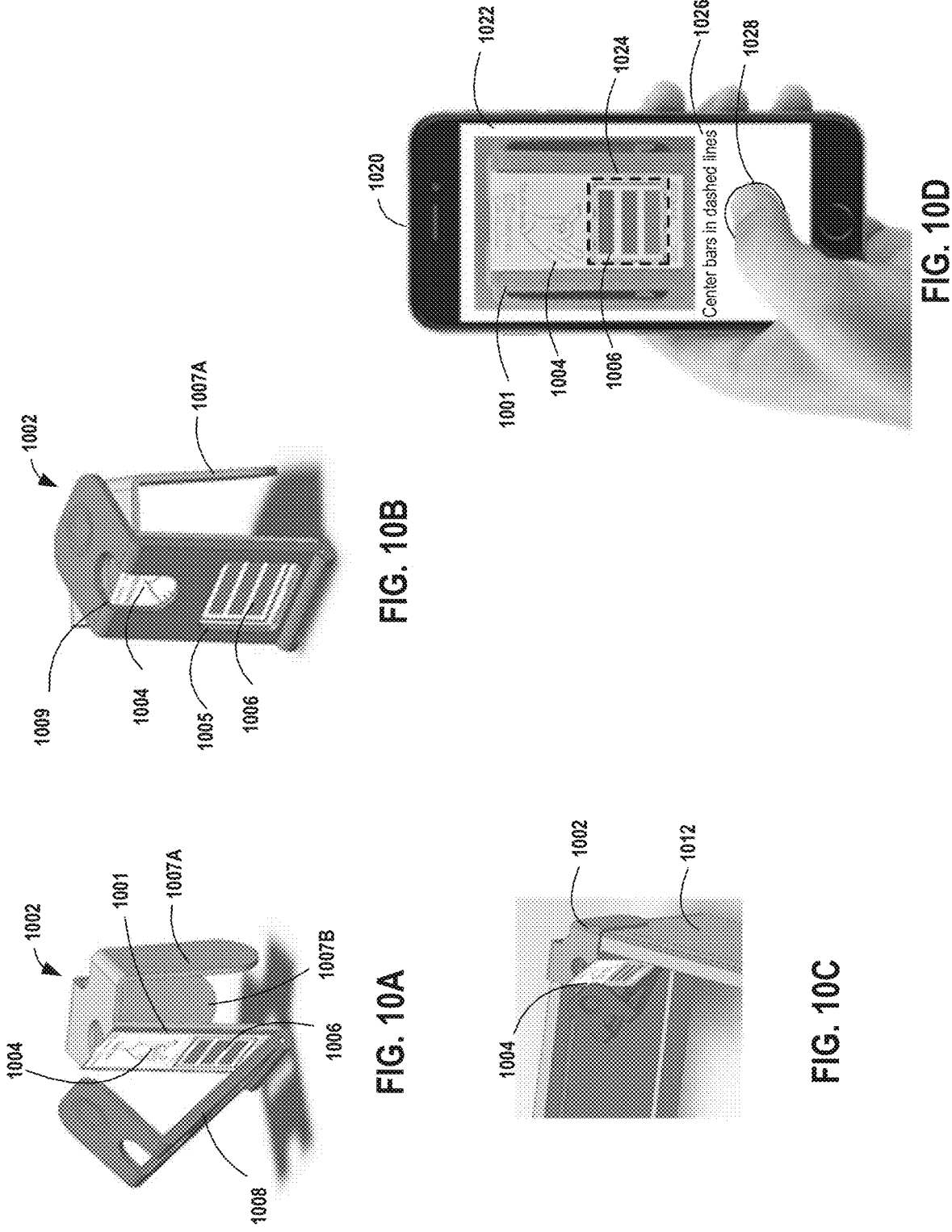
FIGS. 10A-10B show an example coupon indicator and an example coupon holder.
FIG. 10C shows the example coupon indicator and example coupon holder installed on an example dish machine rack.
FIG. 10D shows an example image capture procedure.

FIGS. 10A-10B show an example coupon indicator 1004 and an example coupon holder 1002, and FIG. 10C shows the example coupon indicator 1004 and example coupon holder 1002 installed on an example dish rack 1012. In general, coupon indicator 1004 is a physical card comprised of a water-insoluble (e.g., polypropylene) substrate and three unique, water soluble printed soil bands referred to by indicator area 1006. In some examples, the three different soils printed on the coupon have been designed and optimized for partial removal based on the various cleaning parameters of a dish machine (e.g. water hardness, detergent type, detergent concentration, temperature, and wash time, etc.). In these examples, the indicator area 1006 also includes a distinct bounding box surrounding the three bands of soil, which in some examples is helpful for object detection by a mobile phone app (see, e.g., FIG. 10D). The coupon indicator 1004 also clearly shows a specified region for touching/handling the coupon, a lot number, and expiration date of the coupon. The lot number and expiration date of the coupon may be documented by the mobile phone app using OCR (optical character recognition) technology.

Example coupon holder 1002 is a physical holder comprised of high-heat resistant plastic that is temporarily placed in a dish rack 1012 during the cleaning performance evaluation process (see, e.g., FIG. 10C). The holder is configured to fit in the corner of a dish rack 1012 to ensure consistent placement of the coupon indicator 1004 in the dish machine and is adaptable to a wide variety of dish rack designs. In some examples, placement of the coupon holder in a specific position on the rack is to ensure repeatability of the coupon response to the full range of conditions of the machine wash and rinse cycles that have been tested and verified through experimentation, and that then form the basis of data necessary for predictive algorithm development. Coupon holder 1002 does not require any tools to place in the dish rack, instead leveraging friction to hold itself in place via tabs 1007A and 1007B. Holder 1002 includes an inside back panel 1001 for intuitive placement of coupon indicator 1004 inside the holder 1002 (FIG. 10A). Holder 1002 further includes a hinged cover 1008 that when closed (FIG. 10B), secures the coupon indicator 1004 in place during a wash cycle and includes an open window 1005 surrounding the printed soil area for the wash parameters to affect soil removal during the cycle. Cover 1008 of holder 1002 may also include an optional cut-out 1009 on the top front panel for easy removal of the indicator from the holder after washing.

FIG. 10D shows an example image capture procedure. Inside back panel 1001 of holder 1002 is further configured to provide a consistent background for capturing an image of a coupon indicator 1004 following a cleaning cycle. A user opens the front panel (i.e., cover 1008), rests the holder 1002 on any horizontal surface and then takes an image of the coupon indicator 1004. During an image capture procedure, an image capture overlay, such as dashed lines 1024, and/or one or more instructions 1026 (e.g., "Center bars in dashed lines") may be displayed on a user interface 1022 of a user computing device 1020. Overlay 1024 guides the user in capturing the image to help ensure that image capture across a plurality of coupon indicators and a plurality of users is consistent. Consistent image capture conditions help ensure that the cleaning process assessments determined based on the image of the coupon indicators are consistent regardless of the conditions under which the images were captured.

In some examples, a mobile application (such as site status application 508) uses a computer vision algorithm to identify the soiled region (i.e., indicator area 1006) of coupon indicator 1004 and perform a computation on the amount of soil removed during the wash cycle (and/or remaining after completion of the wash cycle). The image analysis may leverage object detection to identify the soiled region(s) (i.e., indicator area 1006) on the coupon indicator 1004 and quantify the amount of soil present in each band and/or across all three bands of the soiled region(s). In one example, the image analysis may convert the image to gray scale and calculate an average pixel value. The mobile application may also be configured to sync with the local controller on a dish machine (e.g., cleaning machine controller 120 as shown in FIG. 1) and/or a controller of an automatic product dispense system (e.g., product dispense system 130 as shown in FIG. 1) to capture rack event data logged by onboard sensors during the wash cycle (e.g. detergent dose, temperature, cycle times, etc.). The mobile application may also be configured to leverage data stored in a cloud database (e.g., data storage 420/428 as shown in FIG. 4) that is specific to the customer account and the dish machine (e.g. water hardness, customer procedures score, dish machine make, dish machine model, etc.).

In some examples, a machine learning algorithm takes as inputs the image of the coupon indicator captured by the mobile application, data synced from cleaning machine controller 120, and account-specific data from a cloud database and provides as an output a recommendation determining (i) whether a dish machine has been set up to provide optimal cleaning and/or (ii) whether a dish machine is maintaining good cleaning performance during routine service call. The format of this recommendation may include, for example, a recommended list of actions a field associate may take to manually adjust the dish machine to enable improved cleaning performance (e.g. increase detergent dosage, suggest alternative product, change cycle time); a recommended list of automated adjustments that could be made to the controller on the dish machine to improve cleaning performance, prompting the field associate to "confirm" (e.g. increase detergent dosage, adjust temperature, change cycle time); and/or one or more automated adjustments to cleaning machine controller 120 settings to improve cleaning performance without field associate intervention (e.g. automatically adjust detergent set point, automatically adjust temperature, automatically adjust cycle time, etc.).

In some examples, the machine learning model leverages low latency edge computation to provide immediate or real-time feedback to the field associate during service visits and/or real-time automated machine adjustments. In some examples, results from the local computation (e.g. image analysis plus rack event data plus customer data) are also sent to the cloud to enable continuous machine learning model training. This approach leverages large volumes of data from multiple customer locations to improve the metrics and recommendations stemming from the model.

Although the examples presented herein are described with respect to automated cleaning machines for use in food preparation/processing applications (e.g., dish machines or ware wash machines), it shall be understood that the techniques for classification and/or scoring of cleaning outcomes described herein may be applied to a variety of other applications. Such applications may include, for example, food and/or beverage processing equipment, laundry applications, agricultural applications, hospitality applications, and/or any other application in which cleaning, disinfecting, or sanitizing of articles may be useful.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
   storing, in a storage device associated with a computing device comprising one or more processors, a trained acoustic classifier;
   obtaining, by the one or more processors, acoustic data associated with operation of a cleaning machine acquired during a plurality of sample periods;
   determining, by the one or more processors using the trained acoustic classifier, a plurality of predicted operational states of the cleaning machine for the plurality of sample periods based on the acoustic data acquired during the plurality of sample periods, wherein the predicted operational states are determined from among a plurality of predefined operational states;
   determining, by the one or more processors, that a sequence of the plurality of the predicted operational states represents one of: normal operation or anomalous operation of the cleaning machine;
   in response to determining the sequence of the plurality of the predicted operational states represents the anomalous operation of the cleaning machine, identifying, by the one or more processors, a root cause of the anomalous operation; and
   automatically invoking, by the one or more processors, one or more remedial actions associated with the root cause of the anomalous operation, wherein the one or more remedial actions address or alleviate the root cause of the anomalous operation.

2. The method of claim 1, wherein the acoustic data is representative of sounds present in an environment where the cleaning machine is located.

3. The method of claim 1, wherein the trained acoustic classifier is trained based on acoustic training data associated with at least one of normal operations of the cleaning machine and anomalous operations of the cleaning machine.

4. The method of claim 1, wherein the trained acoustic classifier is trained based on acoustic training data associated with one or more root causes of anomalous operations of the cleaning machine.

5. The method of claim 1, wherein the cleaning machine is a dish machine, and the plurality of predefined operational states includes one or more of a machine dwell or idle state, a wash motor on state, a chemistry pump active and wash motor on state, a drain solenoid active state, a fill solenoid active state, and a chemistry pump active state.

6. The method of claim 1, wherein determining the sequence of the plurality of predicted operational states represents one of normal operation or anomalous operation of the cleaning machine further comprises:
   comparing the sequence of the plurality of the predicted operational states with one or more sequences of one or more expected states corresponding to the normal operation of the cleaning machine.

7. The method of claim 1, further comprising:
   generating, by the computing device, one or more notifications for receipt by a user computing device indicative of the anomalous operation, the root cause of the anomalous operation and one or more suggested remedial actions associated with the root cause.

8. The method of claim 1, wherein the one or more remedial actions include at least one of restarting or resetting the cleaning machine, downloading new operating parameters, restarting or resetting a product dispenser associated with the cleaning machine, and shutting down the cleaning machine.

9. A system comprising:
   at least one storage device configured to store a trained acoustic classifier;
   one or more processors; and
   a memory comprising instructions that when executed by the one or more processors cause the one or more processors to:
      obtain acoustic data associated with operation of a cleaning machine acquired during a plurality of sample periods;
      determine, using the trained acoustic classifier, a plurality of predicted operational states of the cleaning machine for the plurality of sample periods based on the acoustic data acquired during the plurality of sample periods, wherein the predicted operational states are determined from among a plurality of predefined operational states; and determine that a sequence of the plurality of the predicted operational states represents one of; normal operation or anomalous operation of the cleaning machine;

in response to determining the sequence of the plurality of the predicted operational states represents the anomalous operation of the cleaning machine, identify a root cause of the anomalous operation; and automatically invoke one or more remedial actions associated with the root cause of the anomalous operation, wherein the one or more remedial actions address or alleviate the root cause of the anomalous operation.

10. The system of claim 9, wherein the acoustic data includes data representative of one or more sounds associated with execution of a cleaning cycle by the cleaning machine and background sounds present in an environment of the cleaning machine.

11. The system of claim 9, wherein the trained acoustic classifier is trained based on acoustic training data associated with at least one of normal operations of the cleaning machine and anomalous operations of the cleaning machine.

12. The system of claim 9, wherein the trained acoustic classifier is trained based on acoustic training data associated with one or more root causes of anomalous operation of the cleaning machine.

13. The system of claim 9, wherein the cleaning machine is a dish machine, and the plurality of predefined operational states includes one or more of a machine dwell or idle state, a wash motor on state, a chemistry pump active and wash motor on state, a drain solenoid active state, a fill solenoid active state, and a chemistry pump active state.

14. The system of claim 9, wherein the memory further comprises instructions that when executed by the one or more processors cause the one or more processors to:

compare the sequence of the plurality of the predicted operational states with one or more sequences of one or more expected states corresponding to the normal operation of the cleaning machine.

15. The system of claim 9, wherein the memory further comprises instructions that when executed by the one or more processors cause the one or more processors to:

generate one or more notifications for receipt by a user computing device indicative of the anomalous operation, the root cause of the anomalous operation and one or more suggested remedial actions associated with the root cause.

16. The system of claim 9, wherein the one or more remedial actions include at least one of restarting or resetting the cleaning machine, downloading new operating parameters, restarting or resetting a product dispenser associated with the cleaning machine, and shutting down the cleaning machine.

17. One or more non-transitory computer readable media comprising instructions that when executed by one or more processors cause the one or more processors to:

store a trained acoustic classifier;

obtain acoustic data associated with operation of a cleaning machine acquired during a plurality of sample periods;

determine, using the trained acoustic classifier, a plurality of predicted operational states of the cleaning machine for the plurality of sample periods based on the acoustic data acquired during the plurality of sample periods, wherein the predicted operational states are determined from among a plurality of predefine operational states; and determine that a sequence of the plurality of the predicted operational states represents one of: normal operation or anomalous operation of the cleaning machine;

in response to determining the sequence of the plurality of the predicted operational states represents the anomalous operation of the cleaning machine, identify a root cause of the anomalous operation; and automatically invoke one or more remedial actions associated with the root cause of the anomalous operation, wherein the one or more remedial actions address or alleviate the root cause of the anomalous operation.

* * * * *